US007062532B1

(12) United States Patent
Sweat et al.

(10) Patent No.: US 7,062,532 B1
(45) Date of Patent: Jun. 13, 2006

(54) METHOD AND APPARATUS FOR DRAWING COLLABORATION ON A NETWORK

(75) Inventors: Mark Edward Sweat, Encinitas, CA (US); Michael William Callahan, San Diego, CA (US); Cyrus Masayuki Kamada, Encinitas, CA (US); Chris Alan Vogelsberg, Langley, WA (US); John William East, San Diego, CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/534,757

(22) Filed: Mar. 24, 2000

Related U.S. Application Data

(60) Provisional application No. 60/126,170, filed on Mar. 25, 1999.

(51) Int. Cl.
*G06F 15/16* (2006.01)
(52) U.S. Cl. ...................................... 709/205; 709/225
(58) Field of Classification Search ................ 709/203, 709/204–205, 217, 218, 219, 223, 224, 225; 707/10, 201; 705/7–9; 345/751, 753
See application file for complete search history.

(56) References Cited

U.S. PATENT DOCUMENTS

| | | | | |
|---|---|---|---|---|
| 5,339,247 A | * | 8/1994 | Kirihara et al. ............. 364/468 |
| 5,388,196 A | * | 2/1995 | Pajak et al. ................. 345/751 |
| 5,638,504 A | | 6/1997 | Scott et al. ................ 395/7.61 |
| 5,675,782 A | | 10/1997 | Montague et al. .......... 395/609 |
| 5,729,734 A | * | 3/1998 | Parker et al. ................... 707/9 |
| 5,815,683 A | * | 9/1998 | Vogler ........................ 395/500 |
| 5,907,677 A | * | 5/1999 | Glenn et al. ................ 709/206 |
| 5,956,715 A | * | 9/1999 | Glasser et al. .................. 707/9 |
| 5,995,097 A | * | 11/1999 | Tokumine et al. .......... 345/331 |
| 6,055,543 A | * | 4/2000 | Christensen et al. ...... 707/104.1 |
| 6,058,395 A | | 5/2000 | Buzaglo et al. ............... 707/10 |
| 6,148,311 A | * | 11/2000 | Wishnie et al. ............. 707/513 |
| 6,205,476 B1 | * | 3/2001 | Hayes, Jr. ................... 709/220 |
| 6,253,216 B1 | * | 6/2001 | Sutcliffe et al. ............ 707/500 |
| 6,269,369 B1 | * | 7/2001 | Robertson .................... 707/10 |
| 6,289,345 B1 | * | 9/2001 | Yasue .......................... 707/10 |

(Continued)

OTHER PUBLICATIONS

Caneparo, "Shared Information System for Urban and Architectural Design," Abstract only, from http://www.caad.ed.ac.uk/europia/abstracts/caneparo.htm, printed on Mar. 18, 2004, publication date unknown.*

(Continued)

*Primary Examiner*—Bradley Edelman
(74) *Attorney, Agent, or Firm*—Gates & Cooper LLP

(57) ABSTRACT

To address the requirements described above, one or more embodiments of the invention provide a method, apparatus, and article of manufacture for a project hosting service that a user can access with a web browser. With it, a user can communicate and collaborate with the members of a design team or construction project. Embodiments of the invention let a user share CAD drawing files (DWG DWF, etc.), document files, or any other type of file. A user can add comments or reply to discussion threads about the file or other aspects of the project. A user can view or download files from anywhere in the world to work on them, while locking the file to prevent others from overwriting the file. When the user is done, the file can be uploaded and unlocked while simultaneously notifying other Project members of the change by e-mail.

47 Claims, 12 Drawing Sheets

U.S. PATENT DOCUMENTS

| | | | |
|---|---|---|---|
| 6,308,212 B1 * | 10/2001 | Besaw et al. | 709/228 |
| 6,353,853 B1 * | 3/2002 | Gravlin | 709/219 |
| 6,381,632 B1 * | 4/2002 | Lowell | 709/203 |
| 6,397,117 B1 * | 5/2002 | Burrows et al. | 700/97 |
| 6,430,567 B1 * | 8/2002 | Burridge | 707/102 |
| 6,445,777 B1 * | 9/2002 | Clark | 379/88.13 |
| 6,785,728 B1 * | 8/2004 | Schneider et al. | 709/229 |

OTHER PUBLICATIONS

Mori et al., "Agent-based Collaborative Design of Parts in Assembly," Sep. 16, 1998, Proceedings of DETC'98, 1998 ASME Design Engineering Technical Conferences, pp. 1-8.*

Carrara et al., "Virtual Studio of Design and Technology on Internet (I) Educator's approach," from http://info.tuwien.ac.at/ecaade/proc/lvi_i&ii/zorgno.html, pp. 1-15, printed on Mar. 18, 2004, publication date unknown.*

Anonymous, "ProjectWise at-a-glance," 1998, Microstation World, vol. 4, Iss. 4, pp. 30ff.*

Business Wire, "WorkPlace Announces ProjectWise WorkGropu; New Collaboration Solution Meets the Needs of Project Team and Engineering Organizations," Oct. 15, 1998, Business Wire, p. 1ff.*

Smith, "Team Up On the Internet," Feb., 2000, Cadalyst, vol. 17, Iss. 2, pp. 52ff.*

Bourdakis, "Utilising Urban Virtual Environments," from http://fos.prd.uth.gr/vas/papers/EuropIA98/, pp. 1-9, printed on Mar. 1, 2004, publication date unknown.*

Kempfer, "ActiveProject 3.0," Jun. 1998, Computer-Aided Engineering, vol. 17, Iss. 5, pp. 38ff.*

Doherty, "Project-specific Web Sites," Mar. 1998, Interiors, vol. 157, Iss. 3, p. 24.*

Smith, "Collaborate on the Web," Feb., 1999, Cadalyst, vol. 16, Iss. 2, pp. 58ff.*

Hernandez Jr., "Collaborating in Cyberspace," Nov., 1998, vol. 39, Iss. 11, p. 23.*

A-E-C Automation Newsletter, Jul. 1998, vol. 22, Issue 7, pp. 1-16, printed from www.aecnews.com.*

Press Release, "Framework Technologies Releases ActiveProject Version 3.0," A/E/C Systems, Jun. 4, 1998, pp. 1-2, printed from http://web.archive.org/web/19980610213045/www.frametech.com/press/release3.html.*

The Global Construction Network, "The PSWS," Apr. 13, 1997, printed from http://web.archive.org/web/19970413231938/gcn.net/psws.pswsbody.html and related pages—pp. 1-9 of printout.*

* cited by examiner

FIG. 10

METHOD AND APPARATUS FOR DRAWING COLLABORATION ON A NETWORK

CROSS-REFERENCE TO RELATED APPLICATIONS

This application claims the benefit under 35 U.S.C. § 119(e) of and commonly assigned U.S. Provisional application Ser. No. 60/126,170, entitled "CAD DRAWING COLLABORATION VIA WEB-BASED SYSTEMS," filed on Mar. 25, 1999, by Mark Edward Sweat et. al., which application is fully incorporated by reference herein.

BACKGROUND OF THE INVENTION

1. Field of the Invention

The present invention relates generally to organizing and providing access to information on a computer, and in particular, to a method, apparatus, and article of manufacture for organizing and providing access to architectural drawings, files, and information over a network such as the internet.

2. Description of the Related Art

The use of Computer Aided Design (CAD) application programs is well known in the art. CAD application programs are often expensive, complex, and difficult to learn how to use. Additionally, architects, contractors, engineers, owners, and other parties involved with a project (referred to as project participants) are often mobile or at different locations. With new technology and the increased use of the internet, project participants often have computers and internet access. Further, the coordination and exchange of information between project participants can be increasingly complex. The prior art does not provide a mechanism for project participants and administrators to easily organize, set access permissions, and access architectural drawings, information, plans, documents, and files.

SUMMARY OF THE INVENTION

To address the requirements described above, one or more embodiments of the invention provide a method, apparatus, and article of manufacture for a project hosting service that a user can access with a web browser. With it, a user can communicate and collaborate with the members of a design team or construction project. Embodiments of the invention let a user share CAD drawing files (DWG DWF, etc.), document files, or any other type of file. A user can add comments or reply to discussion threads about the file or other aspects of the project.

A user can view or download files from anywhere in the world to work on them, while locking the file to prevent others from overwriting the file. When the user is done, the file can be uploaded and unlocked while simultaneously notifying other Project members of the change by e-mail.

Embodiments of the invention provide users with the ability to create their own site, define users, specify a user's access permissions for projects and files, and determine granular access levels (e.g., access for the entire site, a project, a folder, or individual files/documents) without interaction from any third party. Further, all customer activities can be logged. Additionally, one or more embodiments of the invention provide an application programming interface for third parties to create custom clients or permit direct access to a server. Such an API operates with both thick (.exe) and thin (.html) clients.

BRIEF DESCRIPTION OF THE DRAWINGS

Referring now to the drawings in which like reference numbers represent corresponding parts throughout:

FIG. 10 illustrates a Site Administration Activity Log List Options dialog box in accordance with one or more embodiments of the invention;

DETAILED DESCRIPTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide a project hosting service that a user can access with a web browser, standalone executable, and from third party applications. With it, a user can communicate and collaborate with all the members of a design team or construction project. Embodiments of the invention let a user share CAD drawing files (DWG and DWF), document files, or any other type of file. A user can add comments or reply to discussion threads about the file or other aspects of the project.

A user can view or download files from anywhere in the world to work on them, while locking the file to prevent others from overwriting the file. When the user is done, the file can be uploaded and unlocked while simultaneously notifying other Project members of the change by e-mail.

As Project Administrator, a user can decide who can view, edit, or change any Project. This gives the Project Administrator security over vital information and total control of access to confidential data.

Hardware Environment

Figure 1:
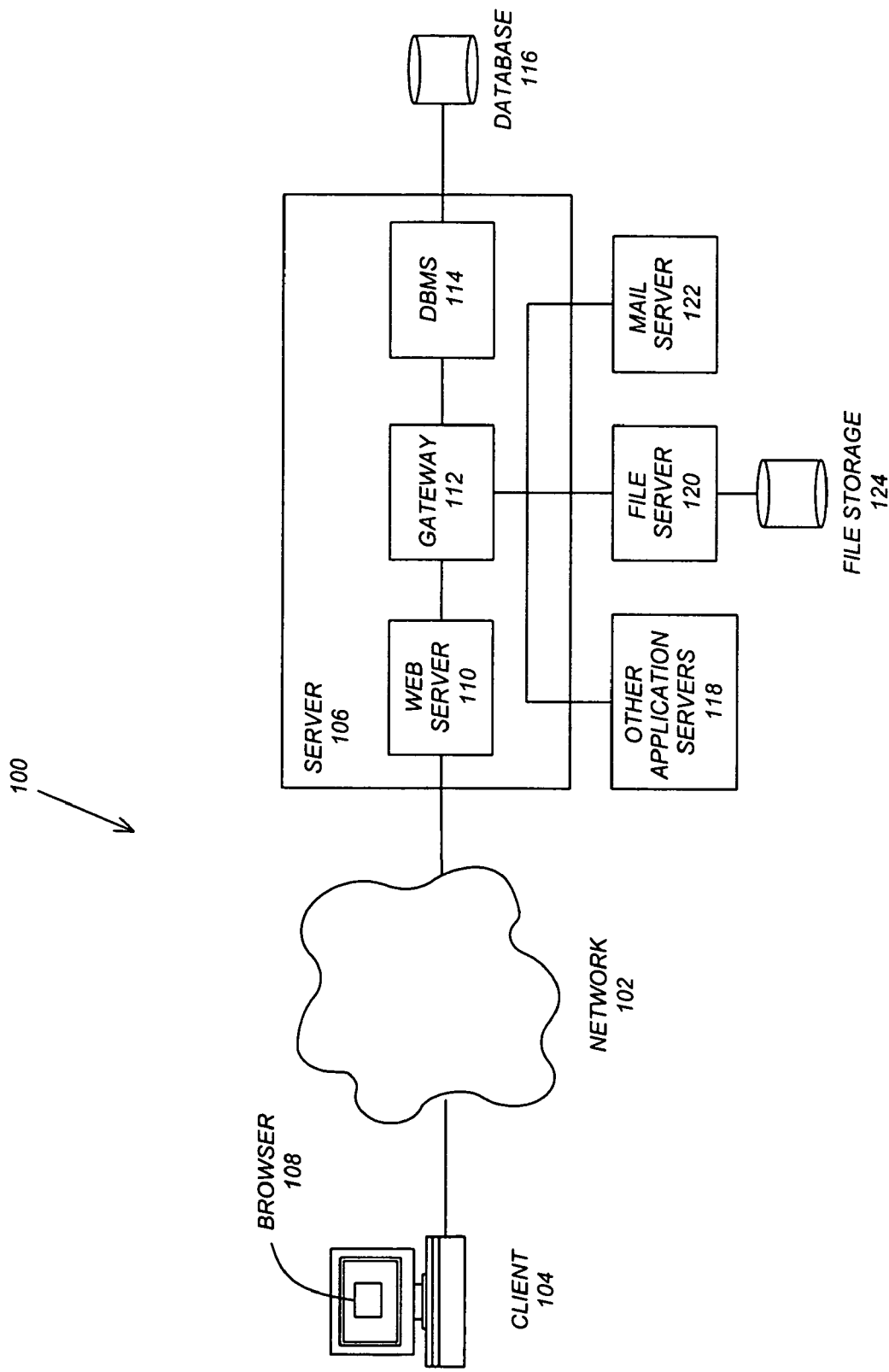
FIG. 1 schematically illustrates a hardware and software environment in accordance with one or more embodiments of the invention.

FIG. 1 schematically illustrates a hardware and software environment in accordance with one or more embodiments of the invention, and more particularly, illustrates a typical distributed computer system 100 using a network 102 to connect client computers 104 to server computers 106. A typical combination of resources may include a network 102 comprising the Internet, LANs, WANs, SNA networks, or the like, clients 104 that are personal computers or workstations, and servers 106 that are personal computers, workstations, minicomputers, or mainframes.

The Internet 102 connects client computers 104 executing Web browsers 108 to server computers 106 executing Web servers 110. The Web browser 108 is typically a program such as Netscape's Navigator or Microsoft's Internet Explorer. The Web server 110 is typically a program such as IBM's HyperText Transport Protocol (HTTP) Server or Microsoft's Internet Information Server. In one or more embodiments, the servers 106 also execute a Common Gateway Interface (CGI) 112 and an ISAPI (Internet Server Application Program Interface), which interfaces between the Web server 110 and a database management system (DBMS) 114 that manages a database 116. Additionally, CGI 112 may interface with other application servers 118, a file server 120 (that accesses file storage 124), or a mail server 122.

Generally, these components 108–124 all comprise logic and/or data that is embodied in or retrievable from device, medium, signal, or carrier, e.g., a data storage device, a data communications device, a remote computer or device coupled to the computer via across a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby. Specifically, those skilled in the art will recognize that the present invention may be applied to any database, associated database management system, or peripheral device.

ProjectPoint™

Software (referred to as ProjectPoint™) provides for the unique organization of folders as containers for storing, managing, and sharing files and discussions for an architectural project. The ProjectPoint™ software may be downloaded and installed on a computer. Further, ProjectPoint™ may work in combination with or independently from a user's internet browser such as the Internet Explorer available from Microsoft™. Once installed, a user may initialize the ProjectPoint™ software by starting the ProjectPoint™ application or by attempting to access a web site (or an area of a web site) that is configured to work with ProjectPoint™ (at which point, the ProjectPoint™ application will automatically initialize on the user's browser 108). Once the software is initialized, the user is prompted to log in using a user name and password (see description below). Upon successful login, information is downloaded from the web site/server 106 to the local computer 104 and displayed in accordance with the ProjectPoint™ software. Thus, Project-Point™ may be viewed as an application and as a web site and applet with a series of pages and programming modules utilized by a web server 110 and web browser 108.

In accordance with one or more embodiments of the invention, ProjectPoint™ is an online service for building design and construction teams that provides an integrated "project" workspace." ProjectPoint™ centralizes the management of project drawings, documents, and communications on a project website. Further, ProjectPoint™ provides relevant content, services, and software tools to help team members complete tasks.

Project Overview

Projects created in accordance with embodiments of the invention behave like Windows™ folders—holding subfolders and files that contain team member and administrative information. Projects can be added at any level of the hierarchy, or within existing projects or folders. Additionally, project folders are easily distinguishable by color from other folders (e.g., project folders may be orange instead of yellow as in traditional folders). Further, standard folders can be converted to project folders, and vice versa, at any level within a hierarchy.

Projects may be organized in any manner desired by a user including but not limited to geographical location, project, or phase. For example, if a project is organized by geographic location, a folder may contain a continent such as Africa, with subfolders for various countries, cities, rivers, or other landmark, and a project folder that contains the relevant files and documents in one or more of the subfolders. If a project is organized on a project basis, each folder may represent a project with subfolders for phases of the project. If a project is organized on a phase basis, individual folders may represent a phase. Projects may be organized by all of the above basis—geographic location, project, and phase.

Navigating

Figure 2:
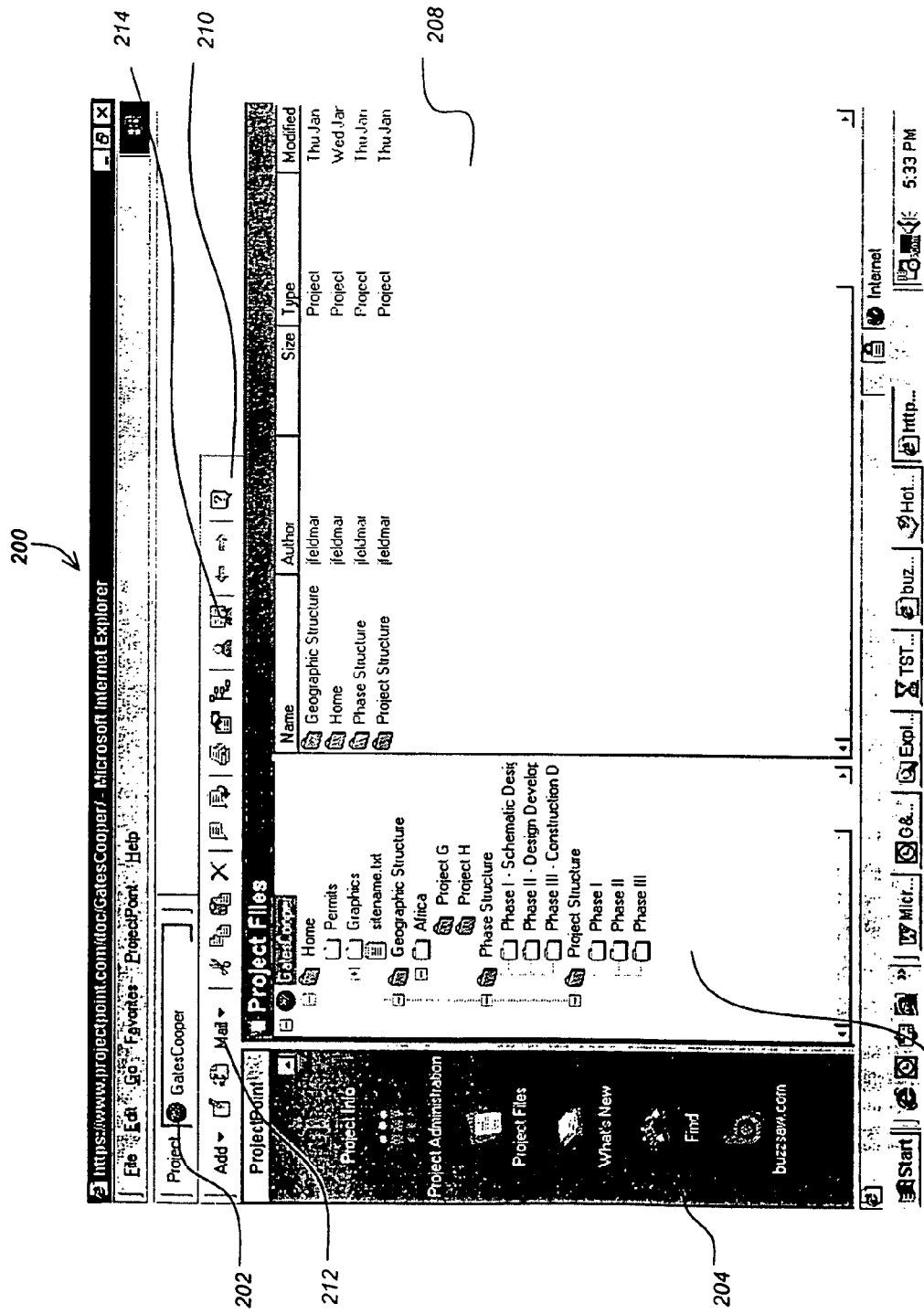
FIG. 2 illustrates a graphical user interface displayed in accordance with one or more embodiments of the invention.

Features are organized in different "regions" in a main window based on their purpose. FIG. 2 illustrates a graphical user interface 200 displayed on browser 108 in accordance with ProjectPoint™. A user can navigate to any component with a click of the mouse. For example, when a user is in a "Details" view 208 and display tabs are showing, a user can simply click on the tab that corresponds to the panel that the user wants to use. After "clicking" on the desired tab, the tab appears on top of the other tabs.

Project selection bar 202 provides a list of all projects a user has access to on the user's site. Project selection bar 202 is a drop down list that allows the user to select a project to work with. The user can select "all" in selection bar 202 to see the site and all projects displayed in the hierarchical tree view 206. Bar 204 provides a mechanism to get to the tasks and activities the user utilizes most often. Tree view 206 contains a hierarchical list of all of the files in the user's site or the currently selected project. The user may click "+" and "−" to show or hide the levels in the tree. When a user selects a folder in the tree view 206, the folder's contents are displayed in the details view 208. Details view 208 displays detailed information about the item that is selected in the tree view 206 hierarchy. The user can choose among the tabs located along the top of the work area to specify the information the user wants to view, work with, and sort by. The standard toolbar 210 provides a shortcut to commands the user utilizes most often (e.g., Add, Edit, Update, etc.).

Drag and drop functionality enables shortcut methods for performing common tasks, such as uploading and downloading files between a server 106 and a user's desktop/client 104. For example, a user can add a new drawing or document file to a project by dragging items from the desktop to the ProjectPoint™ window 200, similar to dragging and dropping files in Microsoft Windows™. Similarly, a user can drag items from the ProjectPoint™ window 200 to the desktop. To drag and drop an item, a user selects the item (by pointing at the item and clicking on it), pressing and holding the left mouse button while the item is dragged to the destination folder in the hierachical tree view 206 (or elsewhere), and releasing the mouse button to drop the item in place. Further, a user can navigate through the tree view 206 by clicking the "+" and "−" to reveal subfolders contained within each parent folder. When a file is added to an existing folder or project, the files "inherit" their permission list from the folder in which they are stored.

A user's permission level and a selected item (project folder, standard folder, sub-folder, or file) determine what options are available when a user clicks the right mouse button. For example, the following table illustrates one or more of the options that may be available:

| Command | What it Does | Who Has Access (required permission level) |
| --- | --- | --- |
| Add Project | Adds new project folder to the hierarchical Tree view. New project folder appears at the bottom of the list. | Administrator |
| Add Folder | Adds new standard folder to the hierarchical Tree view. New folder appears within the selected project folder. | Administrator; Edit |
| Convert to Folder/Project | Converts a project folder and all of its contents to a standard folder. | Administrator |
| View in Window | Opens the item for viewing in a new window. | Administrator; Edit; Review; View |
| Edit | Locks, downloads, and opens the selected file using the application registered to that file type on your computer. | Administrator; Edit |
| Archive | Copies all selected site, folder or file contents to a user's local computer including file versions, discussions, and version comments. | Administrator |
| Download | Copies the file or folder to the user's local computer. The user can include subfolders and overwrite files that exist on the user's local computer, as desired. Does not lock or open the file. | Administrator; Edit; Review; View |
| Update | Use this command to select and upload a new version of a file to the server (typically for a file that has an older version on the server). Usually used after editing. | Administrator; Edit |
| Cut | Copies the selected item to the ProjectPoint ™ clipboard. Once the user has pasted from the clipboard, the original item is deleted in the old location. | Administrator; Edit |
| Copy | Copies the selected item to the ProjectPoint ™ clipboard. | Administrator; Edit; Review; View |
| Paste | Pastes the selected item from the ProjectPoint ™ clipboard. | Administrator; Edit; Review; View |

-continued

| Command | What it Does | Who Has Access (required permission level) |
| --- | --- | --- |
| Delete | Removes the selected item. | Administrator; Edit |
| Rename | Allows the user to rename the selected item. Those with Edit permission can rename standard folders and files only. | Administrator; Edit |
| Mark as Read | Marks the selected item as read, so it no longer appears in What's New. | Administrator; Edit; Review; View |
| Lock/Unlock | Use this command to manually lock a file so other members can't change it. Use the Unlock command to release a lock that the user previously put on a file. | Administrator; Edit |
| Lock Permission/Unlock Permission | Locks or unlocks the selected project, folder, or file permission list. | Administrator |
| Properties | Displays the properties for the selected item. Allows Administrators to modify the access rights for individual folders or project files. | Administrator; Edit |
| Login | Use this command to logout of the site and connect to a different site or reconnect to the current site as a different user. | Administrator; Edit; Review; View; List |

The standard toolbar 210 provides an easy and quick mechanism to get to the tasks and activities the user uses most often. To utilize the standard toolbar 210, the user merely clicks on the button on the toolbar that corresponds with the option that the user wants to use (buttons with arrows open up a menu). The toolbar 210 options/buttons are available depending on the type of file selected and the user's assigned permission level. An option that is not available is dimmed and cannot be selected/clicked by the user. The following table provides the button and the corresponding action available for the button:

| Button | Function |
| --- | --- |
| Add | Allows a user to add a drawing, file, note, link, folder, or project to the user's site. |
| Edit | Use this command to change the contents of a file. The file is locked so that no one else can make changes to the file while the user is working on it. Opens the Save File to Edit As dialog box. Save the file to a folder of choice on the user's local computer. This button is not available if the user has only List or View permission. |
| Update File | Opens the Update File wizard to update a file that the user previously locked and modified. Use this command to complete the editing process. As a result, a new version is stored with the user's updates. |
| Mail | Opens the New Message window. Use to address, compose and send email messages. |
| Cut | Copies the selected item to the clipboard. It is deleted from its original location after the user has pasted. |
| Copy | Copies the selected item to the clipboard. |
| Paste | Pastes the item from the clipboard. |
| Delete Selected | Deletes the selected item(s). |
| Add Comment | Creates a comment which is attached to the selected file. |
| Reply to Comment | Enter reply text to selected comment. Not available to those with View or List permission. |
| Print | Prints the contents of the selected file to the user's local printer. |

-continued

| Button | Function |
| --- | --- |
| Refresh Hierarchy | Updates the project hierarchy. Use this command to make certain that the contents displayed in the ProjectPoint ™ client are up to date with those stored on the server. For example, if another Member added a file to the site after the user logged in, that new file will not be listed in the ProjectPoint ™ client until the user "refresh the hierarchy" or logs out and logs in again. |
| Properties | Displays the properties for the selected item. Allows Administrators to view and modify the permission levels for individual folders or project files. |
| Personal Information | Displays the personal information dialog box and tabs. Allows the user to change personal information at any time. Press this button to change the password. |
| Go Back | Returns to the previous web page that the user was viewing within ProjectPoint ™. Only active when running the ProjectPoint ™ client within a Web Browser. |
| Go Forward | Steps forward to a page previously stepped back from when browsing web pages in ProjectPoint ™. Only active when viewing something in a Web Browser control where the user can go forward and back. |
| Help | Opens the help Table of Contents, related or context sensitive help page, depending on where the user is in ProjectPoint ™. |

As described above, the project selection bar 202 provides a list of all of the projects on a user's site for the user to select. Users of the site will only see those projects that the site administrator has assigned to the user. The contents of the project selected in the project selection bar 202 are displayed in hierarchical tree view 206.

Bar 204 provides easy access to tasks and activities the user uses most often. When an icon (also referred to as a task or task icon) of bar 204 is selected, different options are displayed. For example, view 208 may change completely to display data and tabs according to the task/icon selected in bar 204. Further, by right clicking a task icon, a menu is displayed with choices to open a task, open in a new window, learn more about the task, or login. Similarly, each time a user selects a tab, a different set of options is available. Depending on the assigned permission levels, the following icons/activities are available:

(1) Site Information: Displays important information about a user's site. Administrators can easily change the information displayed in window 208 after selecting this activity based on the communication needs (e.g., the user can create a link to a web site; the content can include an image or an HTML page). The site info activity is available to all users that are members of the site.

(2) Site Administration: Used to perform administrative functions including adding members and groups, changing permissions, and accessing a Site Activity Log. The site administration activity may only be available to site administrators.

Figure 3:
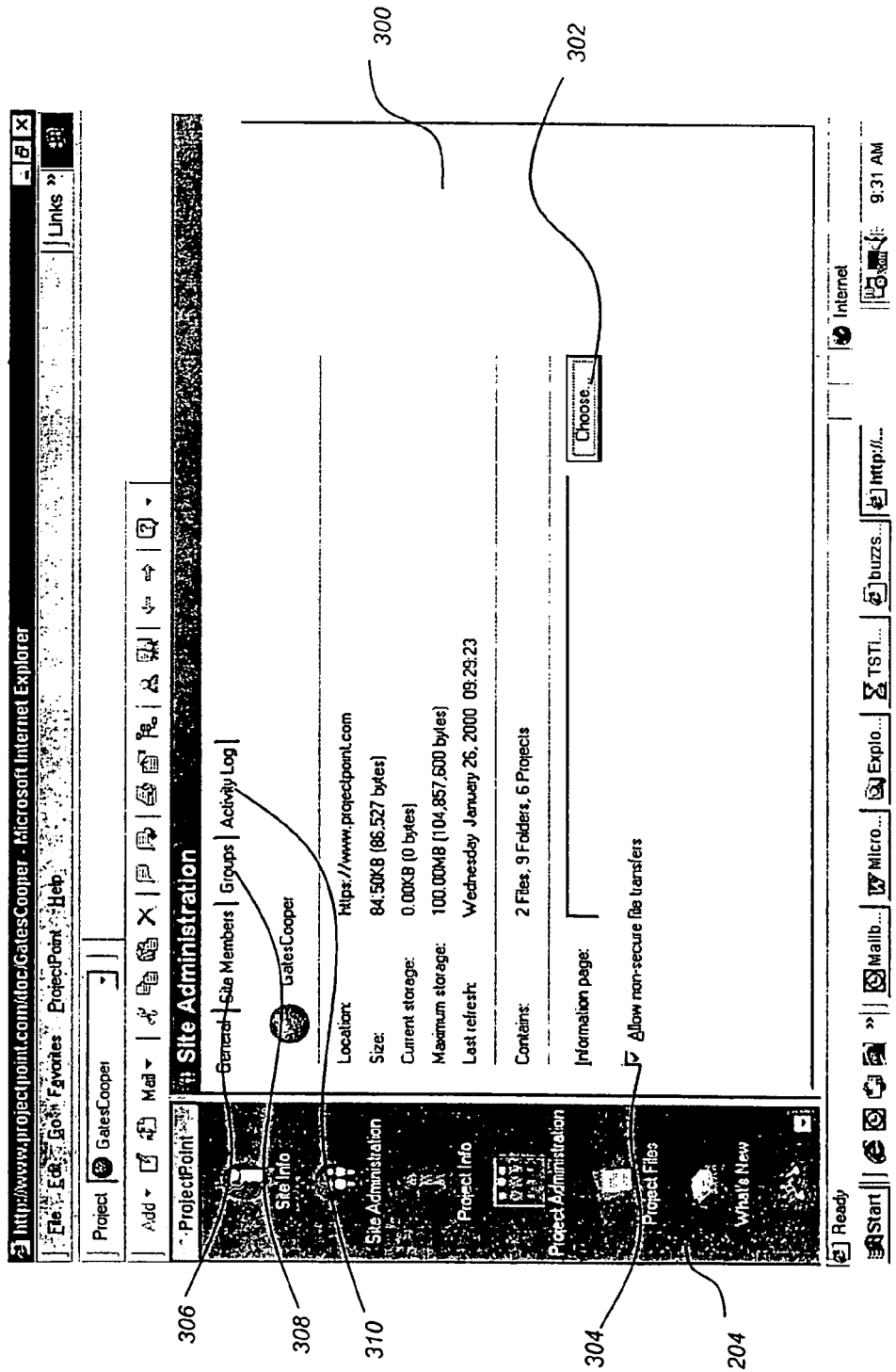
FIG. 3 illustrates a site administration window displayed in accordance with one or more embodiments of the invention.

FIG. 3 illustrates a site administration window displayed in ProjectPoint™. Within the site administration activity, various tabs or areas 300, 306, 308, and 310 may be utilized. In general tab 300, the user may have the ability to view the site name, view the site URL address and the date the site was originally created, view the size of the files currently on the site (including multiple file versions and discussions), view the total number of files and folders in the site, specify the file to be used for the site information page (using choose button 302), or set the system to perform non-secure file transfers between the server and clients 304.

To specify a file to be used for the site information page, the user selects the choose button 302. Choose button 302 present the user with options to use the default page (uses the supplied site information page URL address), to browse the site for a page (allows the user to select a file by browsing through a directory of all files on the current site), or to browse local drives (allows the user to select a file by browsing through a directory of all of the files on the user's local computer and the internet), or to enter the name of the desired file.

The non-secure file transfer option 304 allows the user to specify whether to transport files between the client and the server using the HTTP or HTTPS protocol. The HTTPS protocol provides a secure method of transferring files through a secure socket layer (SSL). In accordance with embodiments of the invention, all other information is transported between the client and the server using HTTPS.

Site members tab 306 may be utilized by site administrators to create new members, add members to a site, project(s), and group(s), edit member information, remove members from a site, project(s), and group(s), change members permission/access levels, and notify members that they have been added or removed from a site, or, that there is a change in their assigned permission level.

Groups tab 308 may be utilized by site administrators to add, edit, or remove groups from a site. If there are a large number of members assigned to projects on a site, and if access needs differ according to job function, groups may be used to organize users and their access permissions. If members are organized into groups and the groups are used in assigning access to projects and files, it is simple to give a new user the same access to a site as other members/users with the same job function. Each time a new member is added to an existing group, the group list is updated and distributed throughout all projects (folders and files).

Activity log tab 310 may be utilized to filter and view site or project data (e.g., when changes were made and the activity of users that have accessed the site). A site administrator has access to the activity log tab 310 and can control what is listed by choosing from a series of filters that show or hide information according to what the administrator wants to view. For example, the administrator can view a broad array of all site information or narrow the information by restricting the date, users, actions, or types fields.

An options tab may also be available within the site administration activity. The options tab may be used to change the site name, determine the "not to exceed" limit on file versions that are saved with each file in the site, create a link (URL address) to the site information page, and create a link (URL address) to the site directory.

(3) Project Information: Provides easy access to important information about a user's project and a project memory directory list. The project info area/activity is available to all project members.

The project information activity may have one tab for information and another tab for a directory. The information tab displays information to the user that has been specified by a project administrator. For example, the site or project administrator can specify any file or URL to be displayed. The directory tab provides a complete list of all project members (automatically updated as members are added) which is available to everyone who is assigned to the project. A user can view directory information in a number of different ways by sorting according to last name, first name, company, work city, and home city. Additionally, an administrator can create a custom page (e.g., containing HTML or images) to be used as the directory page.

(4) Project Administration: Provides the project administrator a mechanism to access frequently used administrative tasks and activities including adding members and groups to a project and accessing a log of all project related activities. The project administration activity is available to site and project administrators.

Figure 4:
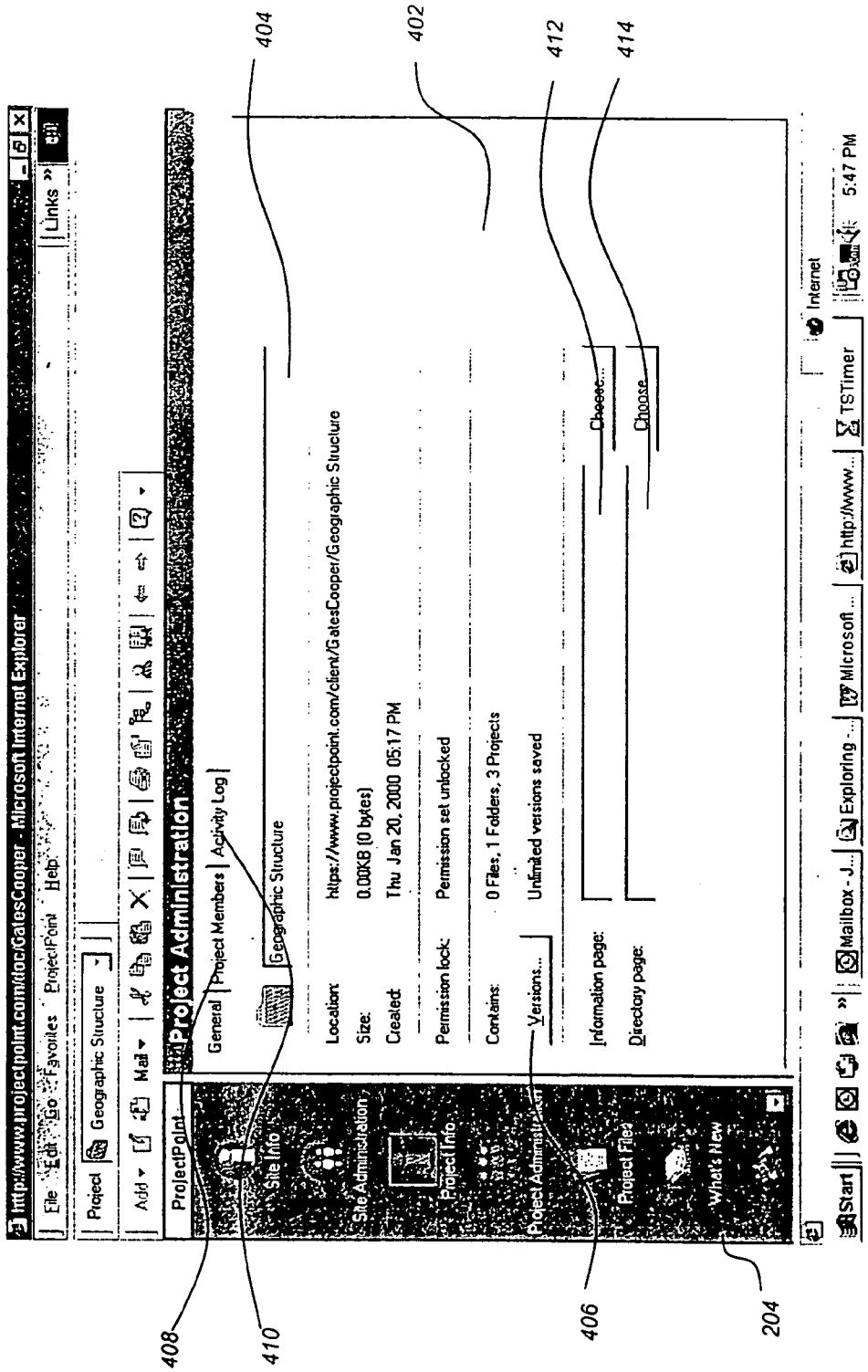
FIG. 4 illustrates a project administration area/activity displayed in accordance with one or more embodiments of the invention.

FIG. 4 illustrates the project administration area/activity displayed in accordance with one or more embodiments of the invention. General tab 402, project members tab 408, and an activity log tab 410 may be provided in the project administration activity. The general tab 402 may be utilized by a project or site administrator to change the project name 404, view the date the project was originally created, its size and URL, view the permission set (lock/unlock) status, view the total number of files and folders in the project, set the number of file versions that can be saved 406, specify a project information page URL 412, and specify a project directory URL 414.

As illustrated in FIG. 4, to change the number of file versions that can be saved, the user merely selects button 406. In response thereto, a dialog is displayed that presents the user with options to "save all" or to set the number of versions allowed in a "limit to" area where the user can enter a number. By selecting "save all", an unlimited number of versions can be saved. Once the number of saved versions is limited, each time a version is saved, the oldest version is "bumped" up to the next number. Once the version limit is reached, saving a new version deletes the oldest version. For example, if a user uploads 10 versions of a document and the version limit is set equal to 5. The versions available would be 10, 9, 8, 7, and 6. If a new version is then added, versions available would be 11, 10, 9, 8, and 7. Version 6 is removed from the system (since the maximum version limit would be exceeded if version 6 remained).

To specify the project information 412 and directory pages 414, the user may select the "CHOOSE" buttons adjacent to areas 412 and 414 respectively. The user is then presented with options to "Use Default" (uses the supplied generic project information page), "Browse Site" (provides a directory of all files on the site), or "Browse Local Drives" (provides a directory of all of the files on the local computer and the internet; the user can choose a file from the list). Additionally, the user can enter an external URL by entering the address in the information field 412 or directory field 414.

The project administration members tab 408 may be used by site or project administrators to add or remove members from a project, change members' permission levels, or notify members that they have been added to or removed from a project, or that there is a change in their assigned permission level.

The project administration activity log tab 410 may be used to view and customize data by choosing from a series of "filters" that show or hide information. Thus, an administrator can view a broad array of information or focus on a specific piece of data according to date, users, actions, or types. The log may only be available to those with site or project administrator permission.

(5) Project Files: Referring to FIG. 2, the project files activity displays a hierarchical tree view 206 (of all of the folders and files in the selected project) and a details view 208, similar to Windows Explorer, of all of the folders and files in the currently selected project. The project files activity is the main working area in accordance with embodiments of the invention. Typically, the project files activity is utilized to add, view, edit, and update project files, and participate in discussions. The project files activity is available to all project members.

Figure 5:
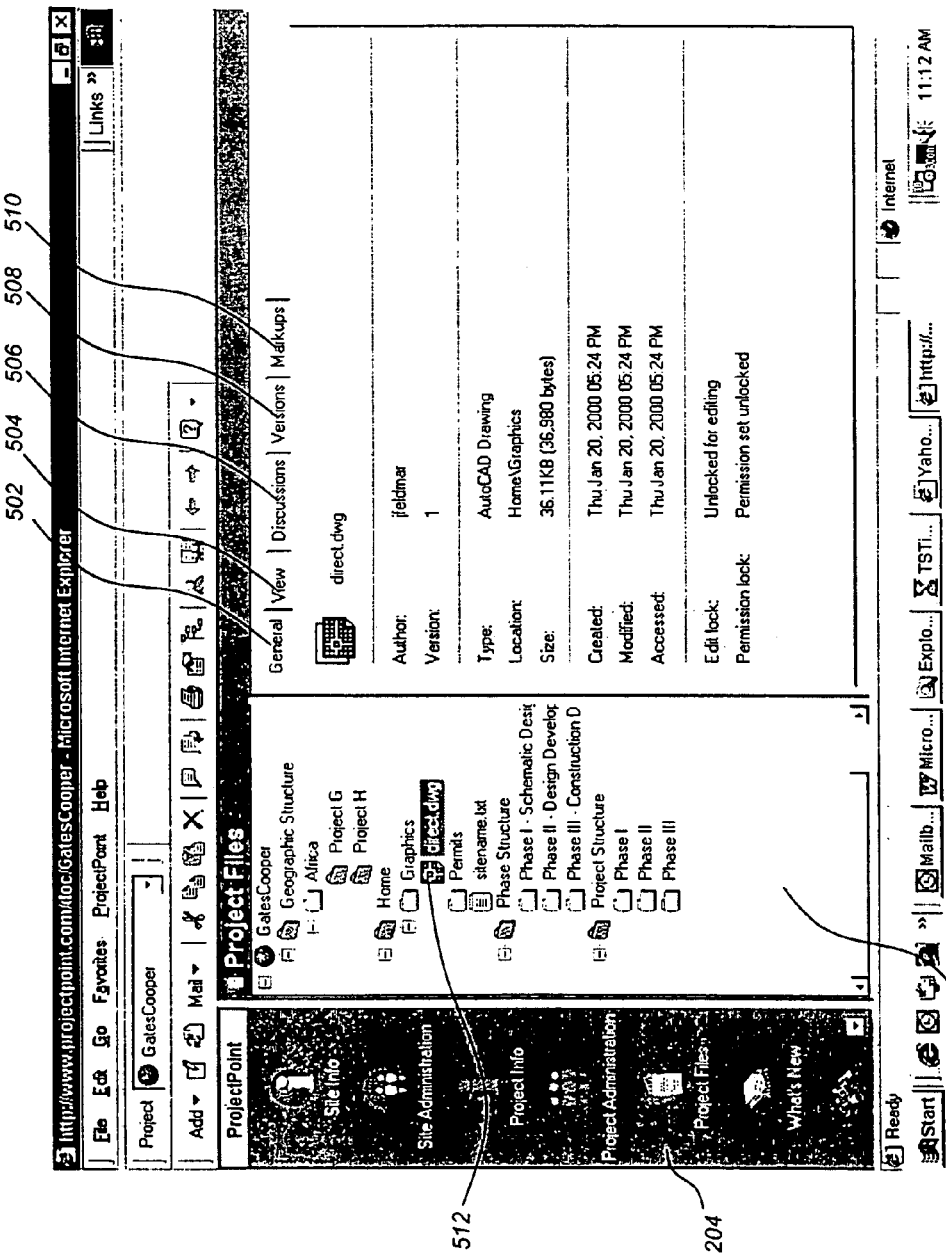
FIG. 5 illustrates multiple tabs displayed in response to selecting a file in accordance with one or more embodiments of the invention.

To reveal or hide levels of tree view 206, the "+" or "−" symbols may be clicked. As described above, when an individual item (i.e., a file and not a folder) in tree view 206 is selected, the details (organized in multiple tabs) appear in the details view 208. For example, FIG. 5 illustrates the multiple tabs 502–510 displayed in response to selecting a file 512 in hierarchical tree view 206.

Project files general tab 502 displays information about the selected project file 512 including the file name, author, version, file type (text, drawing, or note), location, file size, date the file was created, last modified and accessed, edit lock, and the permission set lock. The modification of information in general tab 502 may be limited to a site or project administrator. General tab 502 may be used to view and change the project name, determine the "not to exceed" limit on file versions that are saved with each file in the project, change a link (URL address) to the project information page, and to change a link (URL address) to the project directory.

Project files view tab 504 is used to open and display the contents of a project file in the details view portion of the screen. A user can also add lines and text to drawing files, and save the file with the markups (redlines) as a DWF file to a location of the user's choice (e.g., on the server 106 or on the local computer 104). To view a drawing, Volo View™, Volo View Express™, or any other browser plug-in that displays drawing files may be utilized. Further, depending on the permission level, the right-click menu provides access to available tasks such as edit, download, properties, etc. The view tab is available to all project members except those with List or No Access Permission.

The project files discussion tab 506 displays all of the discussion threads that are attached to the selected project file 512. A discussion thread contains comments, questions, response, or other information input by a user. Additionally, each user entry is identified by the user that entered the entry, the date of the entry, and the version of the entry. Project members do not have to be active participants in discussions to read the comments in a discussion thread. In some circumstances, the user must have administrator, edit, or review permission to participate in discussion threads (start or reply to a comment). If a user has view permission, the user can only read and print the information contained in the discussion thread. If the user has list permission, the user is not able to view the discussion tab 506. Discussions are useful to chain messages together to exchange information and make decisions as a team. Discussion threads are organized and stored along with the related file.

The project files versions tab 508 provides a list of all of the currently selected files. The versions tab 508 is used to open and view any file version, download a selected file to a local computer 104, and review or edit comments that are attached to the selected file version. To open a version, the user selects the version from a list displayed in versions tab 508 and selects a "View in Window" button. Alternatively, the user can click the view tab 504. To download a version of the file from the server 106 to the local computer 104, the user selects the desired version and clicks a "Download" button. Thereafter, the user identifies/selects the target location to save the selected file. The file is then copied to the location specified. To edit a comment, the user selects the version desired, and clicks an "Edit Comment" button. Thereafter, the user can make the desired changes to the comments as needed. The Edit Comment option may only be available to administrators and the owner of the file. Each of the functions (i.e., download, view in window, and edit comment) may also be available from a menu displayed by clicking the right-mouse button.

An additional function that may be available from the version tab 508 is that of updating a file. If the user elects to update a file (e.g., by selecting the "Update" option from the right-click menu), the user is prompted to select the file on the local computer 104 that corresponds to the file 512 to be updated on server 106. The user can also elect to associate additional comments with the new version. Further, the user may have the option of notifying one or more other project members of the updated file (via email).

The markups tab 510 is used to create, view, or edit markup (DWF) files. A user can save markup files to a specified location either on the server 106 or local computer 104.

(6) What's New: Provides a list of everything that the user has not viewed or read across the currently selected project. The list of unread files appears on the left hierarchical tree 206. When a file name is selected, the contents of the file appear in the details view 208 on the right. The what's new activity is available to all project members.

(7) Find: Provides a mechanism to locate files across the whole site, or in individual or currently selected projects. When selected, a dialog box appears wherein a user can limit or expand a search by including search criteria such as text, author, date, sub-folders, etc. Files that match the search criteria appear in the bottom left panel of the hierarchical tree 206. Thereafter, when a file name from the list is selected, the contents of the file appear in the details view 208. The find activity is available to all project members.

(8) Link: Transports the user to a web site(s) that provides an array of industry services, tools, and reference materials. The link activity is available to all project members.

Site Administration

The above description provides an overview of ProjectPoint™ and navigating through the various display areas of ProjectPoint™. As described, project and site administrators control access and content for a site and project. Each site is assigned at least one administrator when it is created. Site administrators can make changes to site member information over the life of a project. For example, site administrators can: add members to projects or groups (who can also function as administrators (usually at the project level), if they are given the proper permissions); change name, password and email address information; change a member's company, title, and description information; and remove members from projects or groups.

To gain access to a site, a user logs in by entering a username and password. Subsequent to login, the user's access is restricted based on the user's access permissions. If the user is an administrator, the access permissions are not restrictive. For example, a site administrator has permission to organize and set up the project structure and add members to the site. Site administrators have access to all of the functions, and can step in any time to make changes or add information as needed. Project administrators have access permissions to add folders and files to the projects that they are responsible for, and assign members and the appropriate member permissions to the folders and files within each project.

Figure 6:
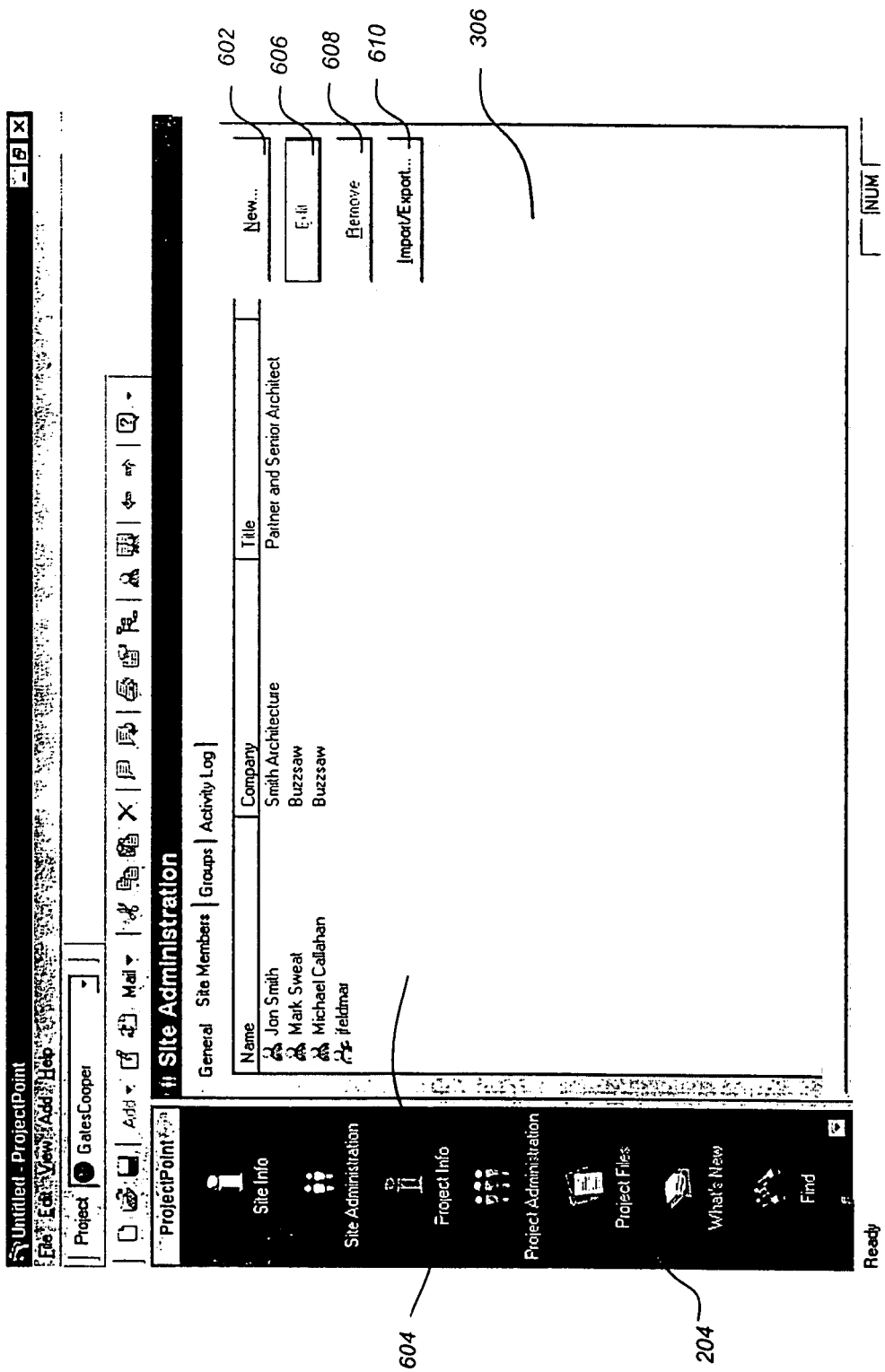
FIG. 6 illustrates a site members' tab in accordance with one or more embodiments of the invention.

To gain access to the site, the site administrator must first add users as site members. As described above, this is accomplished within the site members tab 306 of the site administration activity. FIG. 6 illustrates the site members tab 306 of the site administration area. To edit the member information for a particular member, the member is selected from area 604 and the edit button 606 is selected. Similarly, to remove a member, the member is selected from area 604 and remove button 608 is selected.

Figure 7:
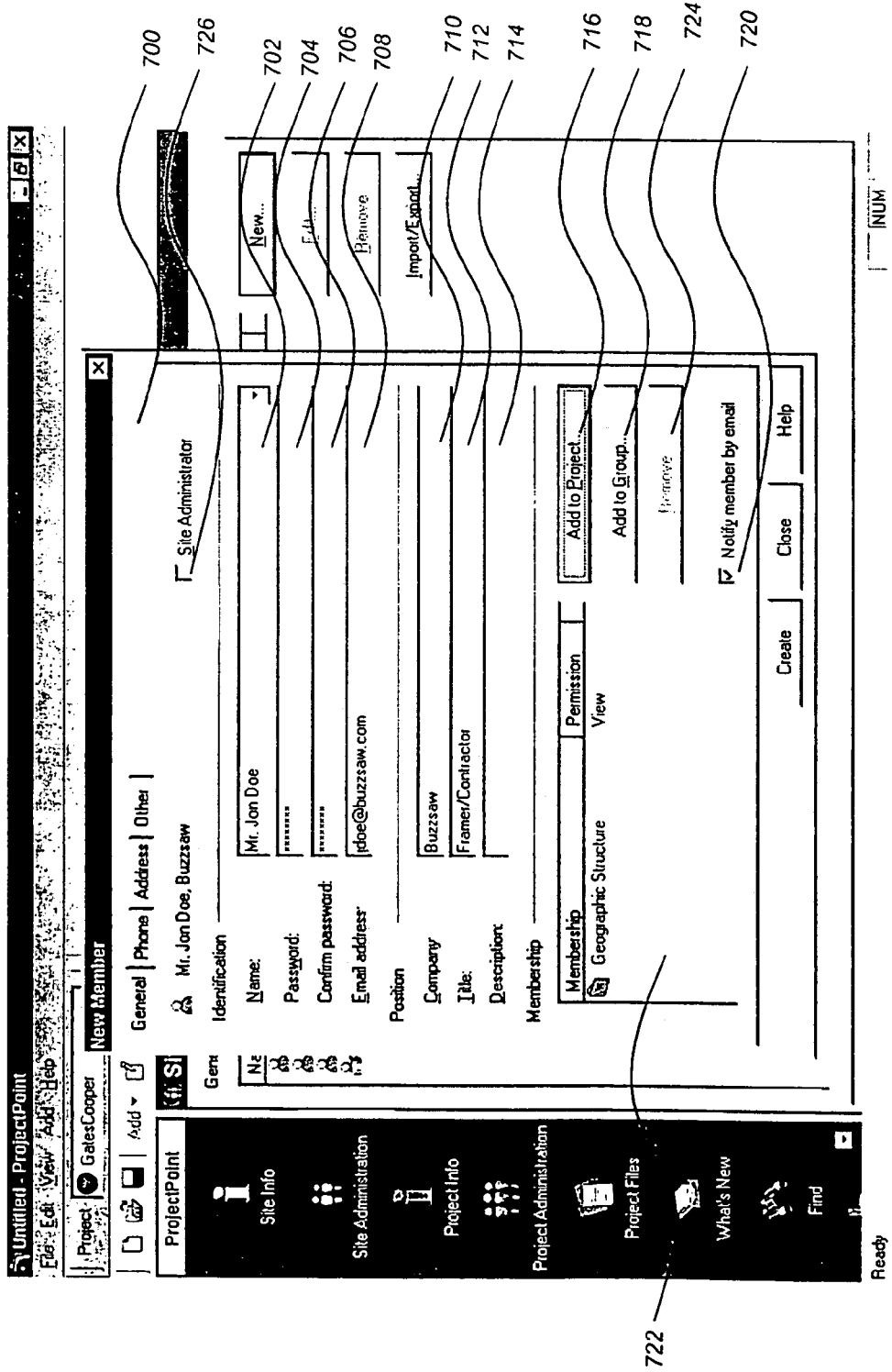
FIG. 7 illustrates a dialog displayed in accordance with one or more embodiments of the invention.

To add a new member to a site, the administrator selects the "New . . . " button 602. In response, the administrator is presented with dialog 700 illustrated in FIG. 7. The administrator can enter a new member name in field 702, a password in field 704 (a minimum of 8 characters with at least one numeral and one upper case letter may be required), the password again in field 706 (to confirm the entry since the entry is masked out when entered in fields 704 and 706), an email address for the member in field 708, a company name in field 710, a title in field 712, and a description in field 714. The administrator can elect to notify the member by email of their addition to the site by selecting/deselecting checkbox 720. The administrator can also provide that the new member is also a site administrator (with all of the site administrator access permissions including access to all files and data on the site with full control to make changes to project and group membership and permission settings) by selecting checkbox 726. Further, additional member information can be input in a phone tab, address tab, or other tab of the dialog 700.

Once the desired information is entered in fields 702–714 and 720, the administrator can elect to add the member/user to projects or groups. However, the administrator can also elect not to add the member to a project or group by selecting the Create button from dialog 700. To add a member to a project or group, the user selects button 716 or 718 respectively. In response, a dialog displays the current site projects and a field to identify the permission level of the member. When the administrator elects to add the user to the desired project or group, display area 722 illustrates the project and the permission level of the user for that project (if the member was added to a group, the group is also listed in area 722). Once added, if the administrator elected to notify the member by selecting box 720, an email is automatically sent to the member notifying the member of the addition to the project(s). Further, the site and project administrator may also be sent an email notifying the administrator of the addition or change.

Similarly, the administrator can select the add to group button 718 to add the new member to a group. In response, a group dialog box is displayed with a list of the available groups that the member may be added to. The administrator can select one (or multiple) group(s) and then add the member to the group by selecting an OK button. Additionally, the administrator is presented with the option of viewing the members of any selected group.

If an administrator wants to add a number of site members without leaving the window 700, as the administrator completes an individual's record, an "apply" button may be selected. The apply button may be listed next to the create, close, and help buttons. Once the apply button is selected, the update is complete and the administrator can continue to add records without leaving the Site Administration window. To dismiss the window and accept changes made since the last time the apply button was selected, the administrator can click the close button.

To remove a user/member from a project from within the site administration area, the member is first selected in area 604, and the edit button 606 is then selected. In response, dialog 700 is displayed wherein a project may be selected in area 722 and the remove button 724 (which is dimmed in FIG. 7) may be selected.

Project Administration

As described above, various attributes of a project may be administered from within the site administration area. However, the site administration area may be limited to site administrators. If a member is only a project administrator, the functions in the site administration area may not be available. Thus, additional area(s) (e.g., project administration and project files areas) may be available to administer projects.

Project member information can be changed over the life of a project. As needed, administrators can: add or remove members from a project; notify members that they have been added or removed from a project, or, that there is a change in their assigned permission level; and change members' permission levels. Project members have viewing and access permission only to the projects which they belong. If a site member is not assigned to any project, the project files tree view display 206 is empty. Additionally, members can have read-only permissions for one project and edit permission for another project (as defined by the project or site administrator).

To edit or adjust any project functions, the administrator must first select a particular project (e.g., the project that the administrator is project administrator for). Thereafter, various options are available. To create a new project (as described above), the user right clicks over an entry (e.g., a folder, another project, or the site) in the hierarchical tree area 206 of the project files area. A menu is displayed and the user can select "Add project". Alternatively, an "Add" button may be selected that presents a dropdown menu to the user with an "Add project" option. A project folder appears in hierarchical view 206 below the selected entry that is automatically selected wherein the user can rename the project.

Figure 8:
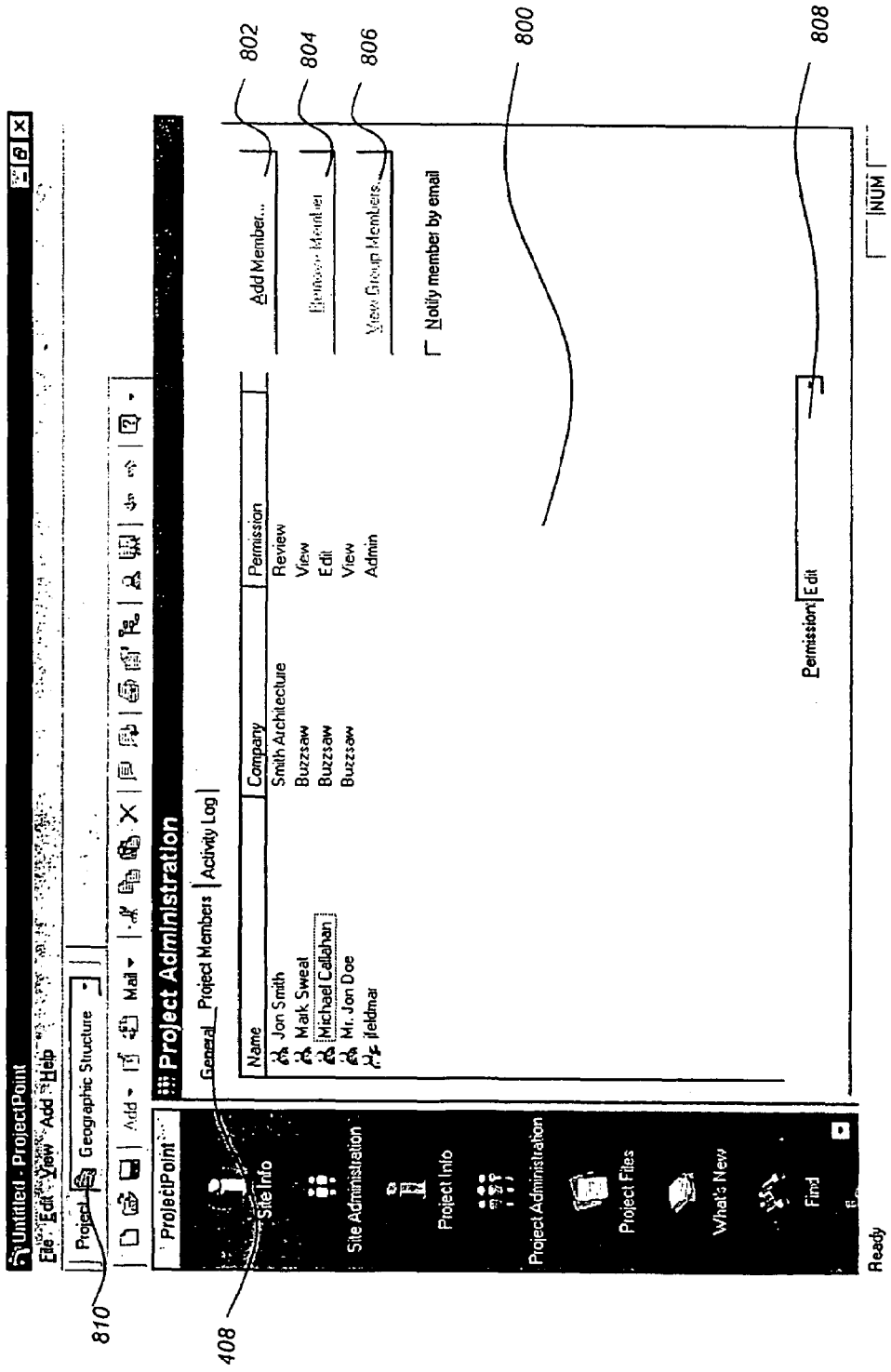
FIG. 8 illustrates a project administration project members' tab in accordance with one or more embodiments of the invention.
Figure 9:
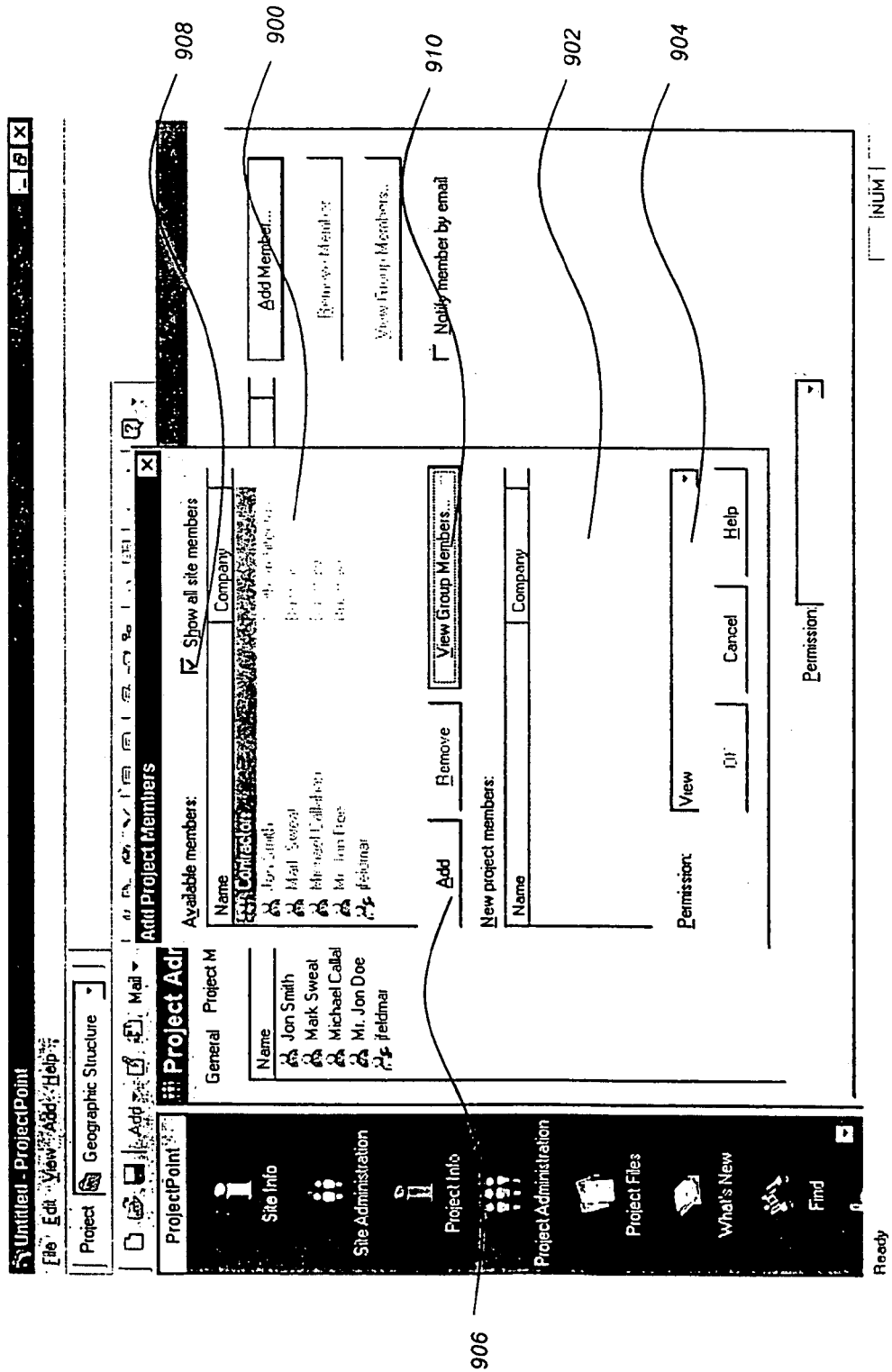
FIG. 9 illustrates the dialog displayed after selecting an add member button in accordance with one or more embodiments of the invention.

If the administrator desires to add a member to a project, the project administration area may be utilized. FIG. 8 illustrates the project administration project member's tab 408. Display area 800 lists all of the current site members that are members of the selected project 810. To add a member to the selected project 810, the administrator selects button 802. FIG. 9 illustrates the dialog displayed after selecting the add member button 802. The names of the currently available members (and groups) are displayed in area 900. Once a member or group is selected from area 900, the administrator can add the member to the project by selecting the add button 906. Thereafter, the member/group is moved to area 902. All of the members of the site can be displayed in area 900 by selecting checkbox 908. Further, the administrator can view the members of a group by selecting the desired group and button "View Group Members" 910. To complete the process and add the members/groups to the project, the OK button is selected. The administrator can also elect to notify the members by email of their addition/removal from a project.

Administrators can archive site, project, or folder contents by copying files to a local computer system. Users may utilize an archive command to copy the files. The archive command is most often used when a project is closed out or when there is a need to free space on the site (e.g., the site space limit has been reached).

When the contents are archived, a copy of all the selected site, project, or folder files, including all file versions and discussion and version comments, are copied to a local computer 104. Version and discussion comments are converted to HTML, and are displayed in a list. Subsequently, a user merely needs to select an item from the list, and the built in viewer loads and displays it in the user's browser.

After the contents have been copied, one or more embodiments of the invention provide for verifying that all the files are in the specified target directory on the local computer 104. Users can then safely delete the items from the site/server 106 as desired.

To archive site, project, or folder contents, the project files area may be utilized. The user selects the items to archive from tree view 206. The right mouse button is clicked and Archive is selected from the menu displayed. In response, a "save-as" dialog box appears. The "Save in:" field drop down menu may be utilized to select the target location for the selected content on the local computer 104. The "File name:" field is utilized to name the folder the file(s) will be archived in. The "Save as type:" drop down menu contains one choice (All Files) which is already selected. The user can then select a Save button to begin the archive process during which the selected contents are copied from the site/server 106 to the specified folder on local computer 104.

Permission Levels and Lists

Control over access to project information is a central function of embodiments of the invention. Permission levels control the access and use of folders and files for every member assigned to project(s) in the Site. For example, when a user is assigned to a project with Review permission privileges, the user has "Review" access to all the files in the project which means that the user can view files and add or edit notes, comments, and links.

Permission lists contain individual members and groups of members, each assigned with the access level needed to work with project folders and files across the Site. A user must be an administrator to add members to permission list(s).

Referring to FIG. 9, when a member is selected for addition to a project, the permission level 904 can be modified by selecting a level from a dropdown menu displayed when the arrow in field 904 is selected. The following permission levels may be available: no access, edit, review, view, list, project admin, and system admin. When new folders are added to a project, the permission list is "inherited" according to the permission list and levels of access assigned at the project (top) level.

If a member has site administrator permission, the member can determine and set up the project structure, create folders and files, and add members to the site. Site administrators have access to all of the functions, and can step in any time to make changes or add information as needed.

If a member has project administrator permission, the member can add folders and files to the projects that the member is responsible for, and assign members and the appropriate member permissions to the folders and files within each project.

Edit permission provides the ability to add, edit, update, rename, or delete project folders and files, and share all information with other project members.

Review permission provides the ability to view all of the files in a project, redline drawings, and add or edit notes, comments, and links.

View permission provides the ability to view project files without the ability to add, edit, or delete them.

List permission provides the ability to see a list of folders in each project without the ability to view the contents of the folders (i.e., the files are hidden).

If a member has no access permission, the member cannot see the project unless the administrator provides the member with permission to view a particular file or folder.

Typically, a member's permission level is set on a project-by-project basis. As described above, Project Administrators have complete control over permission levels and lists that are set at the project level. The permission list is automatically updated and applied to every folder and file in the project. When new folders and project files are added, the permission list is "propagated" downwards through the project hierarchy, according to the permission levels you assigned at the project level. For example, when a user assigns a team member to a project with View permission, that person has View access to every folder and file in the project. As a result, project files can be viewed by that member, but cannot be added, edited, or deleted. However, permissions that are assigned at the top level are not inherited if a folder or file at a subordinate level has permissions locked (see description below).

A user can also assign and preserve a different permission level for a project member at the folder or file level. To accomplish this, the user merely needs to lock the permission set for the folder or file. Thereafter, even if permission levels change elsewhere in the project, the locked item is "skipped" and the permission set remains unchanged.

Thus, if a user has Administrator or Edit permission, the user can lock a file, preventing other project members from editing the file. When the file is locked it remains on server 106 but cannot be edited. However, if the user has Administrator permission, the user can unlock a locked file at any time, as needed. Further, even though a file is locked, it may be downloaded by those with Administrator or Edit permission.

To lock and download a file at the same time, Administrators and Editors can choose Edit from the Standard toolbar. The selected file is downloaded to their local computer 104 and locked on the site. A locked file may be easily identifiable by a lock icon adjacent to the file in tree view 206.

To identify the user that locked a file, the Project Files area is selected. Thereafter, the desired file is selected and the General tab 502 is selected. Files that are locked cannot be moved or deleted. If a user attempts to move or delete a locked file, an error message is displayed. For example, if a user tries to delete a folder that contains a locked file, a warning message is displayed, the folder remains (with the single locked file in it), and all other unlocked files are deleted. However, Project and Site Administrators may have the ability to delete locked files without receiving a warning message.

When a user is ready to move the updated file information back to the server 106, the locked file is automatically unlocked. However, a file can also be unlocked without actually updating it. For example, a user can edit a file and then decide to not incorporate the changes immediately (or at all). Instead, the user can unlock the file so that others have access to it again.

From time to time, a user may choose to lock a single folder or file permission set. As an example, a user may want to control member access to the project's financial folder by locking the folder's permission set. Once that folder's permission set is locked, only team members and groups included in the locked list have access to the folder. In other words, once locked, the specific folder or file permission list remains unchanged, regardless of changes that are made to project-wide permission lists. When a user locks a permission set, the user is locking the entries seen in the Permission list. The list may include a combination of individual members and groups. If a user locks a folder's permission set, and then adds a new member to a group that is in the locked permission list, the new member will have access to the folder or file. For example, if a user locks the financial folder's permission set, and there is a Group in the locked list, it's not a good idea to add a new member to that group while the permission set is locked because the user locked the set to ensure that the group membership would not change. Even though the entries in the permission set do not change, it is possible to go through the "back door", and add a new member to an existing entry (in this case a Group), thus unintentionally giving a member access to a folder.

To ensure membership security, one or more embodiments of the invention provide for not adding new members to Groups when a permission set is locked and not assigning Groups to a security sensitive folder. Instead, members are added individually to ensure membership security to a sensitive folder.

To lock and unlock a permission set (folder or file), the administrator can use the Project Selection Menu 202 to select the desired project. In tree view 206, the administrator highlights the folder or file to work with, right-clicks, and then chooses Lock Permission Set or Unlock Permission Set from the menu.

Referring to FIG. 8, to assign or change permissions at the project level, a project is selected in area 810, and a member is selected in area 808. To adjust the permission level for the selected member, the administrator merely adjusts field 808 to the desired permission level. Alternatively, in the Tree view 206 of FIG. 2, the administrator can highlight the project folder, right-click, and choose Properties from the menu. The members tab is selected, a member's name is selected, and the administrator can then assign or change the permission level in the Permission field.

To assign or change permission at the folder or file level, an administrator also selects a folder or file from tree view 206, right-clicks, and selects Properties from the menu. The administrator then clicks the Members tab, selects the member name from the list, and uses a drop down list to select the desired permission level in the Permission list.

Project Files and Folders

A project folder is automatically generated when a project is created, and by default, appears in tree view 206. A project folder may be used to organize and store folders, project files, text files, other files, drawings, links, notes, etc. that are associated with a project. Project folders are easy to identify/distinguish because the project folder icon is often a different color (e.g., orange), displayed differently (e.g., at a slant), and appears beneath the site level in tree view 206.

If a user has Administrator permission, standard folders can be converted to project folders, and vice versa, at any level of the Tree View hierarchy. For example, if the original standard folder (and all of sub-folders) has grown to a point that it's difficult to manage, a user can convert the standard folder to a project folder, and then rename it, as needed.

Both standard and project folders serve as containers for related sub-folders. The main difference between the folder types is that with project folders a user can designate and change a project info URL, and a user is able to do more administrative tasks by using the Project Administration tabs (only available when a user is working with a project folder). Conversely, it may be that the user started with one project folder, but the organization of the project has changed and grown. Thereafter, all the user needs to do is convert the project folder to a standard folder, and then create a new project folder and as many standard folders as needed to support the new organization of the project. Project and standard folders are automatically sorted and placed in alphabetical order in the tree view 106. If a user wants to re-position a converted folder, the user must rename it alphabetically (first letter of new folder name) for it to appear where desired in the hierarchical Tree view 206.

A user can create and use standard folders and sub-folders to organize and store project information (text files, drawings, links, and notes) to the best advantage for the user's work environment. A user must have Administrator or Edit permission to create standard folders. Standard folders and sub-folders are a different color (e.g., yellow), so it is easy to distinguish them from project folders. If a user has Administrator or Edit permission, folders can be moved from project to project. Users can also drag files into a folder, create notes, or add links within a folder at any level within tree 206.

When a member saves changes or adds new information to files in the client 104 (must have Administrator or Edit permission; those with Review permission can add and save comments only), the new data is uploaded to the server 106.

As a member updates files, the updated file name appears within the project folder in the Tree view 206. As soon as the upload process is completed, the file size changes from 0 to the correct size. If the member is in the midst of uploading files to the server 106 and presses Cancel, a message appears and asks if the user really wants to stop the data upload process. If the member chooses Yes, then the procedure is cancelled without transferring the file(s) to the server 106.

Embodiments of the invention provide a myriad of project tracking tools, so users can streamline project processes throughout design and building cycles. For example, users can publish drawings, solicit and collect feedback, track all revisions and file histories, and efficiently follow all project related activities.

Members/users may follow specified guidelines such as:
If a user wants to work with a locked file, check with the person who originally locked the file before downloading the same locked file to the local computer 104. Thus, the person who originally locked the file can let the user know if it's OK for the file to be unlocked, that it's being worked on, and can direct other team members away from working with the same locked file while it's in use.

Use the discussion feature to let other members know that the user is downloading a file for editing, or, to communicate about folders and files in general.

After a user makes changes to the desired version of the file, upload the version to the server 106. Then, send an email or attach a discussion item to let other members know about the changes.

Assign one person with primary responsibility for keeping edited files organized, named, and backed up to a local computer 104.

A strong relationship may exist between the files and folders stored on the server 106 and those downloaded to a local computer 104. The first time a user downloads and updates files and folders, a directory path is identified for the selected folder(s), which can include all of its sub-folders and files. Thereafter, each time a user downloads and edits items on the local computer 104, or updates them (which creates a new version on the server 106), the default path is automatically used. Although the system remembers the last directory path specified, a user can always modify the path.

Even if a folder is downloaded that contains sub-folders the first time, the user can download single sub-folders or files from the folder at a later time, and the system remembers the directory path based on the most recent directory path provided. If the local directory path changes, the first time the user updates items from a local computer 104, the user can establish a new path simply by dragging and dropping the items from the local computer 104 to the server 106. If a user adds new files to a folder that has been downloaded to the local computer 104, the files are automatically uploaded with the original content of the folder when the user updates to the server 106. Further, when downloading or uploading a folder, only the documents that are changed are moved across the Internet 102. For example, if a user downloads a folder containing 100 documents and during the week, 10 of the documents change, when the user next downloads the same folder, only the 10 changed documents are moved to the client. Uploading documents and folders operates in a similar manner.

To add a new folder, the Project Files icon is selected from the toolbar 204. In the Tree view 206, the user selects the folder where the user wants to add a subfolder. Thereafter, the user clicks Add/Folder from toolbar 210. Alternatively, the user can right-click on the selected folder and choose Add Folder.

After a user sets up a new project, files can be added to the project. File types may include drawings, text files, links and notes. Files can be added to any project folder to share with others and to collaborate and exchange ideas about the contents, or allow others to edit selected files. When a user adds a file to a project, it is copied from the local computer 104 across the Web 102 and placed inside the destination project folder within your site. The file is stored on the server 106 and is available to other project members, as determined by their permission levels. To add a file, a user selects the project desired in field 202. In the Tree view 206, the user selects a "target" folder. The user then selects the Add/Document option from toolbar 210. Alternatively, the user can drag the existing file(s) from the local computer 104 to a folder in ProjectPoint. In response, an Add to Project Wizard opens. The Add to Project Wizard prompts a user through various steps and options, such as attaching a comment and sending email notification.

Users can add a link to a file or folder. A link is a shortcut to a Web site or to another file or folder on a project or site. A user can create a link to anything that has its own URL, including web pages, or any folder or file in a project website. Links can be added to a file, or to a note.

Adding a link to folder(s) and file(s) provides an easy way for others to view related or reference information. For example, a link can be added to a particular drawing file to provide a quick way for project members to get to the drawing file information from another location on the site. To add a link to a folder or file, the user selects the project in field 202. The folder or file where the user wants to store the link is then selected from view 206. The Add/Link option is then selected from toolbar 210. In response, a dialog appears with a field for the user to enter a title (for the name of the link; this is the name that appears in the project folder), and an address (for the entire URL for the web page; e.g., http://www.autodesk.com). The user can also click the browse folder to select a folder or file from another location on the site. Once completed, the user clicks Finish to add the link, or Next to add a comment or send an email notification.

To copy/paste a link to another folder or file, the desired link is selected from tree view 206, the user right-clicks, and chooses copy from the menu. The user then navigates to the target folder or file, selects it, right-clicks, and chooses Paste from the menu. Alternatively, the cursor can be utilized to drag the original link to the destination folder or file.

Adding a link within the text body of a note provides an easy way for others to view related or reference information.

For example, a user can send a note to a project member and include a link to a vendor's web site. To add a link to a note, the project is selected in field 202 and the folder or file where the note and link are to be stored is selected in area 206. The user then selects Add/Note from toolbar 210. The note and format are entered as desired. Embodiments of the invention may provide simple formatting options such as font, point size, etc. The user then highlights the text within the note that will become the hyperlink. A globe icon may then be selected and the user enters the desired destination URL in the address field. Alternatively, the user can click the browse folder to select a folder or file from another location on the site. The user clicks OK and Finish to add the link, or Next to add a comment or send an email notification.

Notes are text files that are created and stored in folders within a project. When a user creates a note, a stand-alone file is created that can be edited or updated directly within the project site, without requiring an additional application. Additionally, some simple formatting options (font, point size, etc.) may be available when creating a note. Additionally, a user can create a hyperlink in a note. For example, a note may be created about the specifics of a folder or file, or, simply to record a user's thoughts. Then, as with any other file in ProjectPoint, users can email the appropriate project member(s) to notify them that the note has been posted. Each note may be stored in the associated project folder. Unlike Comments (and Discussion threads) notes cannot be chained together.

To add a note, the "target" folder or file is selected in tree view 206. The Add/Note option is selected from toolbar 210. An Add to Project Wizard window opens and prompts the user to enter a note and to format it as desired. The Next button is then selected. Additionally, a user can initiate a threaded discussion by adding a comment, which becomes the first discussion item for this file. Further, a user can send email to notify team members that this file has been posted. To copy the subject line and comment from the previous screen into the email, a user clicks Paste comment. To select an email recipient from the list of Project Members, the user clicks To. Once finished, the user clicks Finish to add the note and send the email notification.

File versions allow the opportunity to create multiple versions of a single document wherein prior versions are available for viewing. When a user creates a new file version, an updated version of a file that already exists on the server 106 is updated. The new version is often added to a folder in the project where an older version with the same name exists. The updated version of the file becomes the new version (e.g., version 2), and the older version remains the same (e.g., version 1). The version number for a document may never change even after updates or another version has been deleted.

To create a new version, the user can drag the desired file from local computer 104 to the desired project location or in the standard toolbar 210, the user clicks the Add or Update button. In response, the Update Project Documents Wizard appears. The file to be updated is selected (from the local computer 104) (or the user can click browse to navigate and select the desired file) and the Next button is clicked to accept the file information as it appears. Additionally, a user can add a subject line and a comment, which becomes the first discussion item for this document. Further, the user can send an email notification about this file.

A user can easily download a project or standard folder and all of its contents to a local computer 104, make changes to some (or all) of the downloaded files, and then upload the modified files by choosing the Update File Wizard. Files may be automatically compressed when they are being transported to the local computer 104 or the server 106.

To download a folder, a user selects the folder or file to download from view 206. The user then right-clicks and chooses Download from the menu. In response, a Download dialog box appears. In the To: field, the user enters the destination path for the downloaded item on the local computer 104 (or the user can click browse and navigate to the correct destination location). Thereafter, the directory path chosen becomes the default, so the next time a file or folder is downloaded, the same path address will automatically appear in the To field. A user has the choice to accept the default, or choose a new path. If a user is downloading a folder and wants to include all the subfolders within the selected folder, the Include subfolders box may be selected. In the Replace locally modified files field, the drop down menu may be utilized to choose one of the following:

Ask before replacing—Provides a prompt before downloading a folder or file from the server 106 that may have been modified more recently on the local computer 104.

Replace—Automatically downloads a folder or file from the server 106 with files that may have been modified more recently on the local computer 104.

Don't replace—If a more recently modified folder or file exists on the local computer 104, skips downloading files from the server 106.

Once the above steps are complete, the user can click Download to complete the download process.

Activity Log

Activity logs are maintained for all activity on a site, project, or for individual files. Activity logs may only be available to site or project administrators.

Different log files are available in various places. If a member has administrator permission, the activity logs are available at both the site and project administration icons, or from the properties command (available by right-clicking on the toolbar 210). If the member is a project administrator, the activity log is only available from the project administration icon, or from the properties command.

Whether a member uses the Activity Log to view site or project-wide activities, the member can select from a series of "filters" to control what is listed. As a result, the information appears (or is hidden) according to the filters selected.

Figure 10:
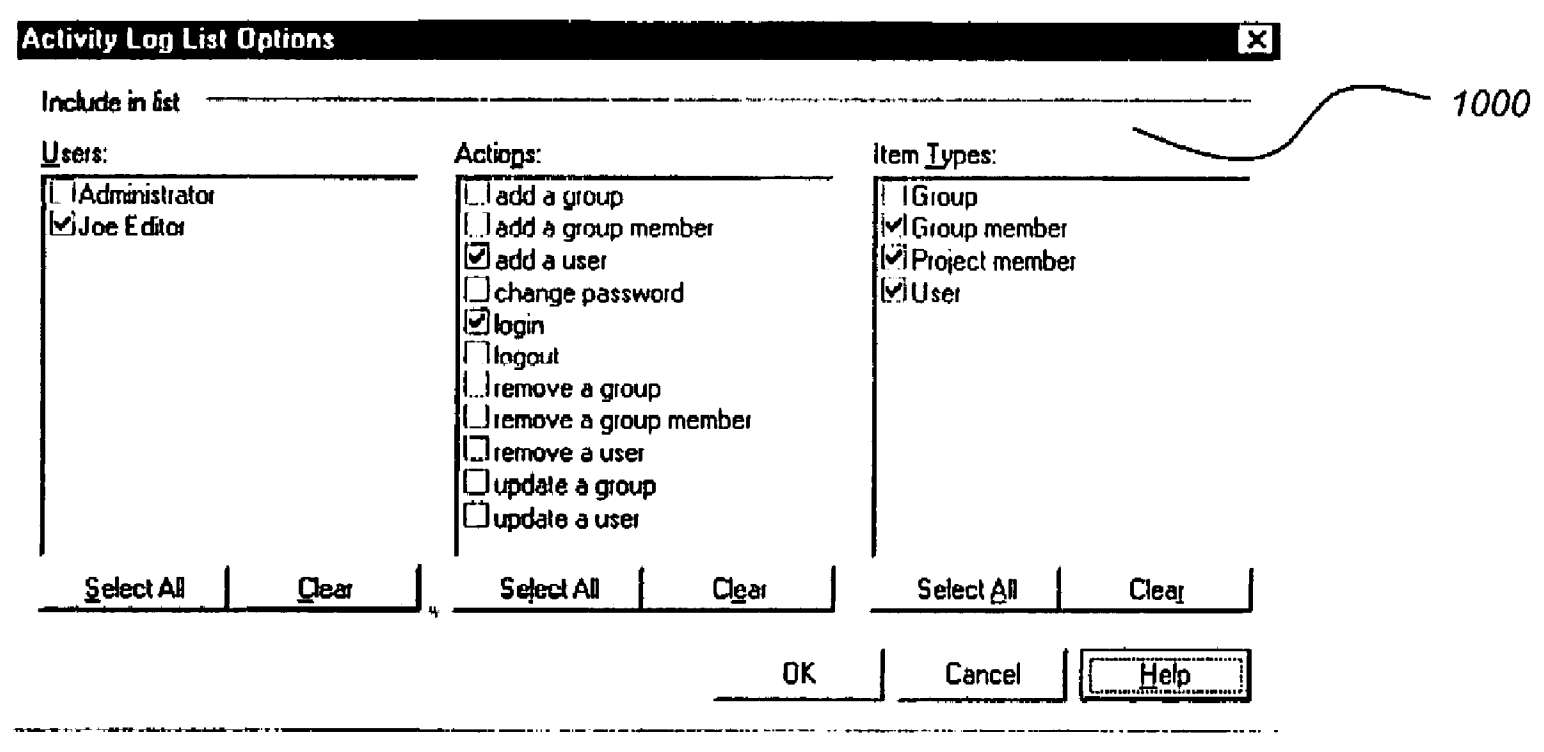

The Site Administration Activity Log provides information about the actions of site members. The Activity Log can be customized by choosing among activities such as login/logout, members added to the site, remove a user, etc. FIG. 10 illustrates the Site Administration Activity Log List Options dialog box.

The Project Administration Activity Log provides information about all tasks or activities (read, create version, lock edit, update, etc.) that have taken place within the selected project. For example, if the user wants to know if a team member has worked with the files in the Project A Review folder within the past two days, the user enters the Date parameters, and selects the checkboxes for Name and Action in dialog box 1000. The information requested appears in the activity log. In accordance with embodiments of the invention, all of the actions that can be performed on a site and a project are listed in the actions field of the activity log dialog box 1000.

When a member views the Activity Log for a single file, the log contains all of the actions that have taken place, including the date the file was created, the author, and a list of all the actions (such as read, update, create version, etc.). A member cannot filter the data that appears in this Activity Log. For example, when a file is placed on the server 106, and the member wants to see who has looked at the file since it was posted, the Activity Log tab can be used to view the information.

Discussion Threads

As described above, embodiments of the invention enable users to add and chain together messages to exchange information and make decisions as a team. Discussion threads are organized and linked to a specific file (drawing, document, note or link). Discussions can be read by members with Admin, Edit, View, or Review permission. Project Members do not have to be active participants in discussions to read them. For example, if the user wants to copy a drawing file to a "Review" folder on the site, a discussion thread may be started at the same time, letting the appropriate team members know of any additional details about the file. By starting a discussion, reviewers may reply by adding additional comments as they work with the file. Members with Review, View, and Edit permission can follow along without adding or replying, as the discussion evolves. Discussion threads cannot be deleted unless the associated file is deleted. When the file is deleted, all the connected discussion threads are permanently removed from the system.

Groups

Site Administrators can create a group of members, and then add the Group to any level of the project hierarchy (project, folder, or file level) across the Site. As a result, each time a new member is added to an existing group, that member has access to all projects, folders, or files where the Group is assigned. If there are a large number of members added to projects, and if access needs to differ according to job function, the creation and use of Groups to assign members is an easy mechanism to utilize. By using groups, multiple individuals may be treated as a single entity. Thus, by adding and removing groups, the user can manage dozens of individuals at once, instead of one at a time. A user must create a Group before adding it to any particular project, folder or file. When a group is created for the first time, individual team members are added to the group list. However, a permission level for the group does not need to be assigned until the group is assigned to a project, folder or file.

Groups may be organized and created based on job function (e.g., one group contains viewers, another group contains editors, etc.). Thereafter, an entire group can be applied to the appropriate item. If there are individuals who perform multiple functions, embodiments of the invention add the individuals to the various projects, folders, and files that they will be working with (instead of as part of a group). Thereafter, users can assign the permission level for the individual based on the appropriate level of interaction needed for each corresponding item. When a Group is added to a particular project, folder, or file, a permission level for the Group is also assigned. By doing so, the individuals in that Group automatically gain access at the permission level assigned to the group.

Figure 11:
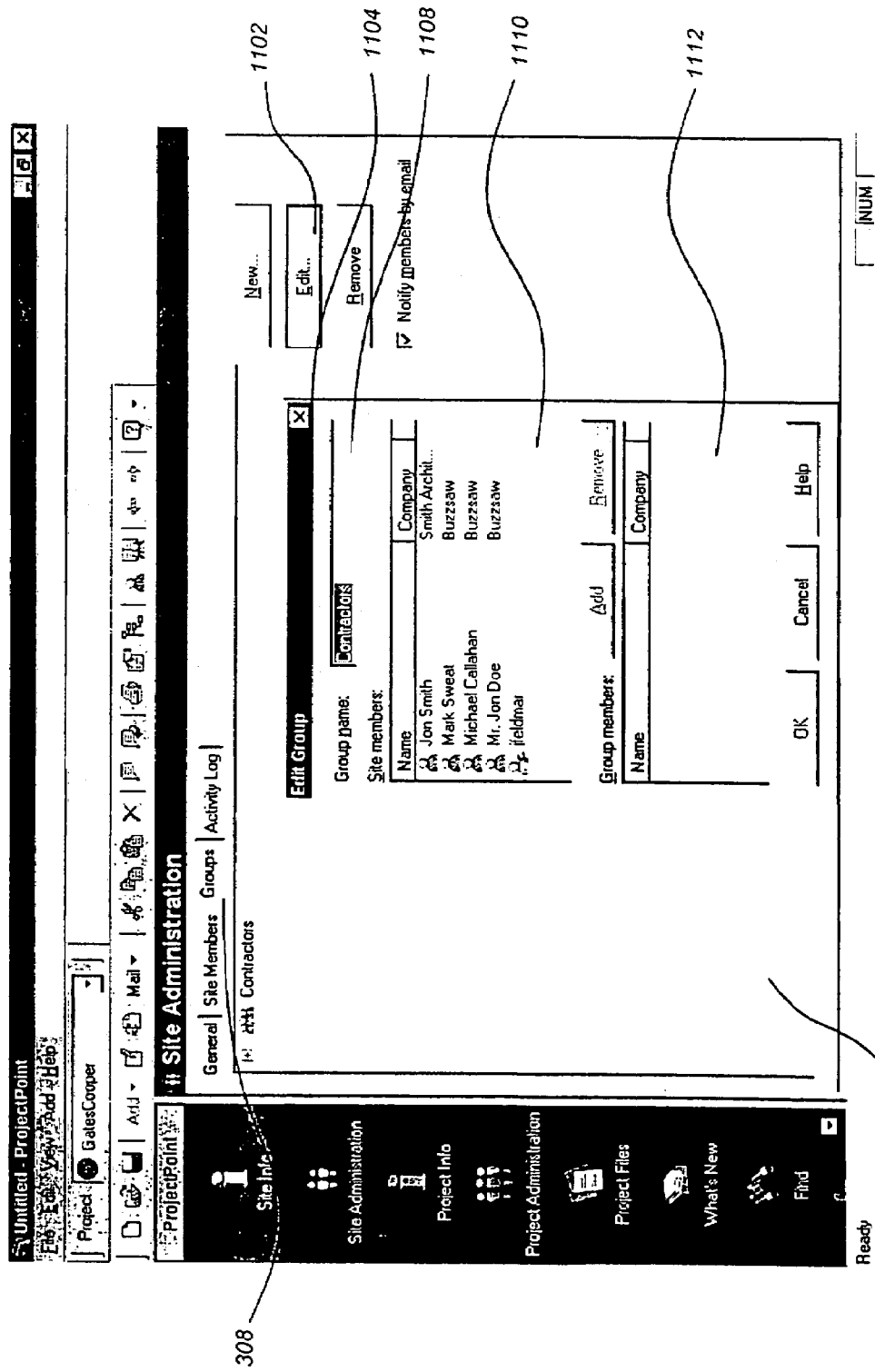
FIG. 11 illustrates a groups' tab and an edit group dialog box in accordance with one or more embodiments of the invention.

An administrator can create a group of members and then add the Group to one or more projects across a site. Then, each time a new member is added to an existing group, that member has access to all projects where the Group is assigned. FIG. 11 illustrates the groups tab 308 and the edit group dialog box 1104. To create a group, the administrator first selects the groups tab 308 from the site administration area. All existing groups appear in the groups list 1106. Clicking the + symbol to the left of the group name reveals a list of all currently assigned members. If the pane is empty, it means that a group has not been created yet. The administrator clicks "new" to display a "New Groups" dialog box. Thereafter, the administrator can enter a group name (e.g., in a field similar to Group name field 1108) and click OK. In accordance with one or more embodiments of the invention, group names can contain up to 32 characters.

To add a site member to a group, various mechanisms can be utilized. The groups tab 308 of the site administration area may be utilized. Once the groups tab 308 is selected, the desired group is selected from area 1106 and the edit button 1102 is selected. In response thereto, the edit group dialog box 1104 is displayed (if the group was just added, the edit group dialog box 1104 may automatically appear after creating the group). In the Site Members List 1110, the administrator selects the member's name, and then clicks the Add button. Once added, the member's name appears in the Group Members List 1112. To add more than one member to the group, the Shift and Ctrl keys may be utilized to select multiple users. When the Shift key is held down and another name is clicked, all the selected items and all items between them are selected. When Ctrl key is held down and another name is selected, only that name is added to the select list. The Membership list 1106 shows the newly created group.

Similar to adding members to a project, the project selection menu may be used to select the project to which the group will be added. The project members tab 408 of the project administration activity is selected by the member. The add member button 802 is selected to display the add project members dialog box of FIG. 9. In the available members list 900, the member selects a group name and clicks Add 906. To determine who is currently assigned to a group, the member may select the group in the available members list 900, and then click View Group Members button 910. Once added, the group name appears in the new project members list 902. An administrator can select more than one group by using the Shift and Ctrl keys. When the Shift key is held down and another name is clicked, the selected names and all the names between them are selected. When the Ctrl key is held down and another name is selected, only that name is added to the select list. From the Permission list 904, the member chooses a permission level for the group(s). To automatically notify Project Members that they have been added to a Project(s), in the Project Members tab view, the administrator can select the notify member by email checkbox.

Markup (Redline) Files

Markups (redlines) are colored lines used together with text to mark areas of a drawing that need discussion or revision. A markup may be viewed as a layer that overlays a drawing rather than a part of the basic drawing file.

Markup data may be stored in files in DWF format, either with the original drawing file or in a separate location from the original drawing in a specified location (e.g., on the server 106 or on a local computer 104). Markup files can be edited and re-saved as needed. A user must have Admin, Edit, or Review permission to create markups.

For example, if a user wants to provide a DWG drawing to a project member for review and possible revision, the drawing file is copied to a project folder on server 106 and the email notification option is used to communicate the file location and availability for review. The project member can review the file, add markups, and then save it to the appropriate markup folder on the server 106. Users can then access and review the markup file, and add comments or make revisions as necessary.

Markup files may be named by placing "markup of" before the name of the drawing file and .dwf is used as the file extension. For example, a markup file for a drawing named "kitchen.dwg would be "markup_of_kitchen.dwf".

When a user adds a markup file to a project, it is copied from a local computer 104 across the Web 102 and placed inside the destination project folder within a user's site on server 106. Once stored on server 106, the markup file is available to other project members, as determined by their permission levels. To copy a markup file from a user's local computer 104 to server 106, the project is selected, a "target" folder is selected in tree view 206, and the Add/Markup option is selected from toolbar 210. Alternatively, the user can drag the existing markup file(s) from the local computer 104 to a folder in ProjectPoint™. Upon dragging and dropping a file, an Add to Project Wizard opens. The Add to Project Wizard prompts a user through the remaining steps and options, such as attaching a comment and sending email notification.

To markup a file that is on server 106, the user selects the file to markup in the project files activity, moves to view tab 504 (or to markups tab 510), and right clicks over the displayed drawing. The right-click action will display a menu providing a markup option with the ability to sketch, comment, or save. Additional markup capabilities may be available depending on the viewer and software utilized. The ability to markup a drawing and store the markup files are aspects of the drawing/viewing software utilized by the viewer (e.g., Volo View Express™, Volo View™, AutoCAD®, etc.). Markups or markup files may be stored and viewed separately and may be in one or more versions of the file. To view a markup file, the user may be presented with the "View in Window" option as described above.

Viewing Files and Multiple Views

To view project files including drawing files and markup files, a user must install the appropriate viewer to open and view drawing files. Client computer 104 may use the same plug-ins and ActiveX controls that a browser 108 uses to display files. If a user can't see the drawing files (DWG, DWF, or DXF) when loaded into a browser, the user may not be able to view them. One or more embodiments of the invention work with Autodesk WHIP!® Viewer and Volo™ View Express. Users can view files from anywhere around the world, but the drawing file formats that the user is able of viewing depends on the viewer that is installed on the computer. To find out which viewer is installed, in the View tab, right-click, and then choose About.

As described above, the Autodesk WHIP!® Viewer may be utilized. With WHIP!, a user can view Drawing Web Format (DWF) files only. An advantage to using WHIP! is that it doesn't take long to download. However, WHIP! cannot view DWG files. WHIP! displays drawings inside a Web browser and inside standard Windows applications, so the user can view drawings online and offline.

Volo™ View Express is one type of viewer that may be used with ProjectPoint™. The Volo™ View Express software is ideal for users that have simple view-and-print requirements because it lets anyone view and print DWF files, 2D/3D DWG, and DXF files. The Volo View Express software is based on AutoCAD® technology for compatibility with AutoCAD software. DWG, DWF (drawing web format), and DXF files appear as they would with AutoCAD software.

From time to time, it is helpful to view and work with several project files or reference the task and activity options used most often. There are a couple of ways to work with files to accomplish this easily and efficiently. A user may choose one of the following options:

View in Window—This option is used to open a selected file in the Details view (so the user has access to all of the tabbed options) in a separate window. Because the selected file information appears in a separate window, a user can then view any number of details about two files at the same time.

As an example, if a user wants to view a drawing, but also needs to view the related discussion thread, the drawing file is selected from the list in the Tree view 206, the user right-clicks, and then chooses View in Window. The selected file appears in a separate window. The user sees the contents of the file (View tab 504) and also has access to all the other tabbed options (General 502, Discussion 506 and Activity Log). By navigating back to the first window and selecting the Discussion tab 506, a user can read the information in both the View 504 and Discussion tabs 506 as needed.

Open in New Window—This option is used as a convenient work tool to locate the task and activity options used most often (Site Administration, Project files, What's New, etc.) in a separate window from the main Browser. For example, if a user is working in a particular file, but wants to reference the Project Information page, the user may right-click the Project Info task, choose Open in New Window, and select the Project Information tab. The project information is displayed in a separate window from the browser, and the user hasn't lost place with the original workspace. To view multiple windows at the same time, the mouse can be used to resize and position each separate window.

Personal Information

Personal Information tabs provide a place for members to change their password, phone number, and address information. Members can modify personal information at any time. To change personal information, a Personal Information icon is available in bar 204. To complete changes, one of the following tasks may be utilized:

General—to make changes to the user's name, password, email address, and job description information;

Phone—to make changes to the user's phone numbers; and

Address—to make changes to the user's address information.

Email

One mechanism of the invention may be used for easily creating and sending email messages to other project members. Sending a message works in much the same way as Microsoft Outlook. There are a couple of convenient ways to go about creating messages, depending on a user's work style. A user may only be able to see lists of members for the project(s) the user is assigned to.

To create an email message, the user chooses the "Mail" button 212 which presents a drop down menu with an option to send email. After selecting the send email option, a new message window appears: The new message window can be used to address, compose and send email messages. Additionally, various formatting options may be available. The user can click a recipient type from the choices that may include: To—primary recipients of your message; Cc—Carbon copy, for secondary recipients; and Bcc—Blind carbon copy, for secondary recipients not identified to the other recipients, including those in the Cc list.

Alternatively, in the new message window menu, the user can click a tools option, and then choose the select recipients option from the list. In response, a select recipients window is displayed. The select recipients window is used to select the project, and message recipients. To select a project, the drop down menu in the list field is used to select the project. The member list for the selected project appears on the left. To see the member list that includes all the members on the site, a user may choose the site name. To select recipients, the user selects the member name(s), and then clicks To->, Cc->, or Bcc->. The selected name(s) are added to the corresponding recipient list on the right.

A user can search the member list data, including Name, Company, and Title using a find option. Once the information is entered into the search string, the first item that matches the search string is selected. Groups are expanded as needed to display found items. If a match isn't found, a "text not found" message may be displayed.

To search for specific member data, the search string is entered in the Find text field and the Find Next button is selected. Thereafter, the user selects the member name(s), and then click To->, Cc->, or Bcc->. The selected name(s) are added to the corresponding recipient list on the right.

When a user has completed selecting recipients, the OK button is selected which returns the user to the new message window to complete the message. To enter a title in the Subject line, the cursor is positioned in the text box located directly beneath the Subject line, and the message text is entered. Once completed, the user may have the option to:

Print the Message—In the New Message window menu, click File/Print;

Insert text from a file—In the New Message window menu, click Insert/Text from File, select the file, and then click Open;

Insert a link—Select some text (will become active link). Click the Insert Link icon (or in the New Message window menu, click Insert/Link). In the Create Link dialog box, enter the URL address you want to link to, or click Browse to navigate and select the file you want from the site, and then click OK;

Send an email message. Click the Send icon or In the New Message window menu, click File/Send Message.

Thereafter, the new message window closes, and the message is sent to all recipients. A copy of the message is also sent to the user's email account for confirmation and logging.

Import and Export User Information

Site Administrators can save time when adding members to the site by using an Import/Export feature. For example, when a user imports user information from an account list, the specified information may be automatically copied to a new member record. Once the imported information is in software provided in accordance with embodiments of the invention, the user merely has to add the desired site or project specific information to the new member's record.

To import user information, the site members' tab 306 of the site administration is utilized. Referring to FIG. 6, the import/export button 610 is then selected. In response, the Import Export Members Wizard appears. The Import Export Members Wizard provides a sequence of displays that leads a user through the process of importing or exporting information.

If the user desires to import information, the Import radio button should be clicked. A File Name section allows the user to click Browse and navigate to the desired file. A File type drop down menu allows the user to choose the file type. Some of the file types may include: All files [*.*], Comma Separated Variable Files [*.csv], or Tab Delimited Files [*.txt]. Once the desired file has been selected, the user can click Open to open the file. The Delimiter field may be utilized to indicate what separator appears between imported or exported fields of information. For example, delimiter field choices may include Comma, Tab, or Other. When a user selects Other as a delimiter field choice, an additional Edit field may appear. The Edit field can be utilized to enter the delimiter character or string to use as a delimiter.

Figure 12:
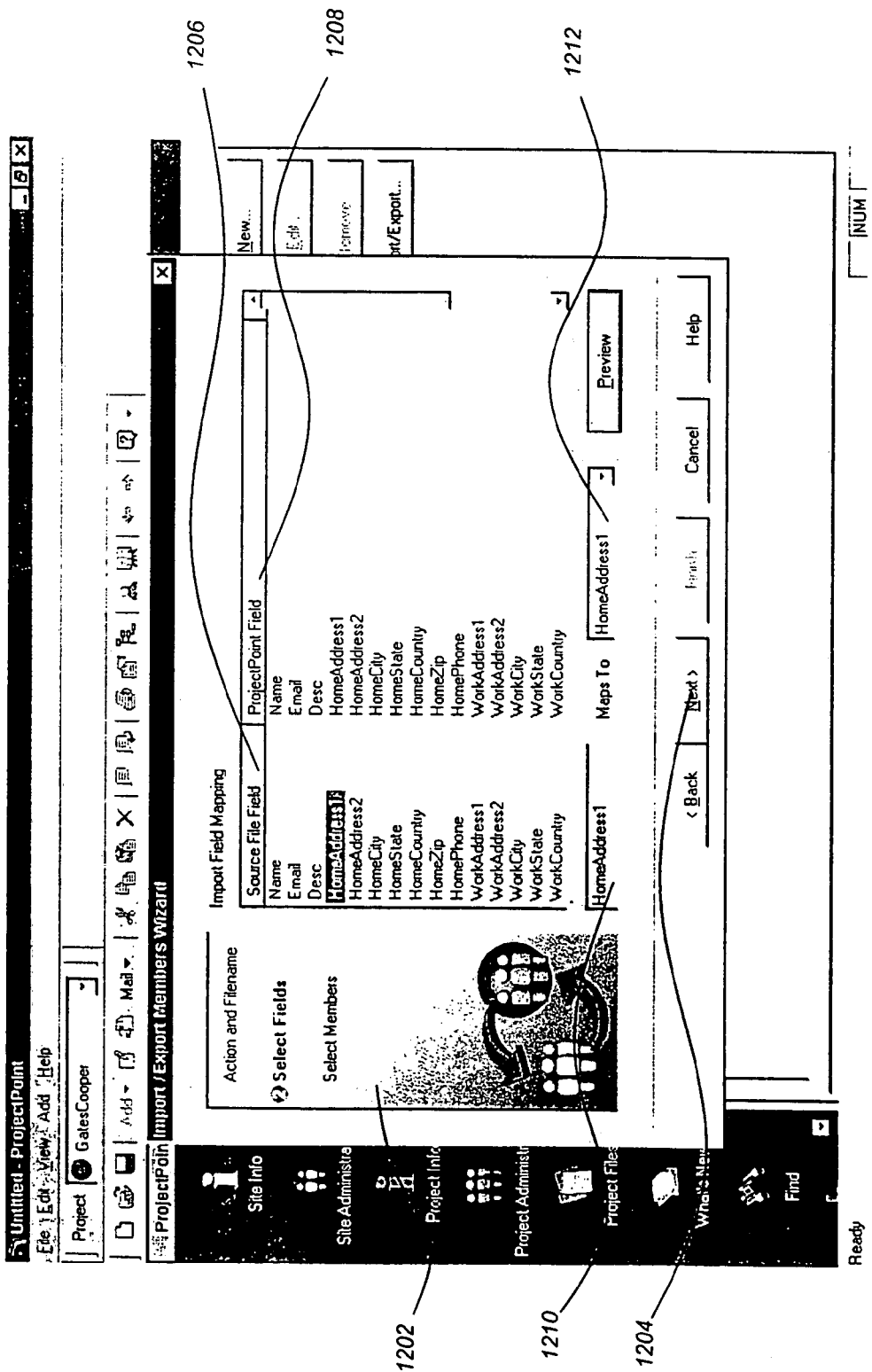
FIG. 12 illustrates a select fields' display screen provided in accordance with one or more embodiments of the invention.

Once the user elects to import or export, specifies the file name, and specifies the type of delimiter, a Next button is utilized to proceed to the next display screen of the wizard. FIG. 12 illustrates the select fields display screen provided in accordance with embodiments of the invention. Section 1202 illustrates the current step in the import/export process (e.g., (1) Action and Filename, (2) Select Fields, or (3) Select Members). An Import/Export mapping list and fields can be utilized to match a column heading (of the source file) 1206 to the selected information 1208. When a user selects the source file field 1206, it appears in field 1210. The user then selects a target field in box 1212. By specifying a source field 1210 and target field 1212, the user is able to map the selected file 1210 to target field 1212. A user may have the ability to preview and confirm column heading and information choices as they will appear after they are imported or exported by clicking the Preview button. Once the desired fields have been selected, the next button 1204 is selected.

In response a Select Members window appears. The Select Members window displays a list of the site members in a Select Members list. The user can select the member names to add to ProjectPoint™. To add ALL members to the Select Members list (even if some are not selected) the user can click Select All. To remove all the members from the Select Members list, the user can click Clear All. Members names may not be added if a duplicate name already exists in the ProjectPoint™ database or if a new name does not have an email address attached to it. Member names that are not added will remain in the Select Members list with a highlighted user icon. Once the desired members are selected, the user can click the Finish button. Thereafter, imported information appears in the Site Members tab 306.

Newly imported members may receive two automatically generated email messages. The first message may contain the URL to the site (and project, if added at the same time), User Name, and Project information (if the new member was added to a project at the same time). If a new site member is added to a project at a later time, they receive a separate email with project specific information when they are added to a project. The second message may contain a New password (randomly generated).

To export user information, an export radio button is selected from the first screen displayed by the Import Export Members Wizard. A Save As dialog box allows the user to select the target location for the exported information file, and confirm or rename the selected file. Once the name and location is selected/entered, the user can click a Save button. The Delimiter field may be used to indicate what separator appears between imported or exported fields of information. For example, choices may include Comma, Tab, or Other. When the user selects Other, an additional Edit field may appear allowing the user to enter the delimiter character or string desired. Once complete, a Next button is selected.

In response, the wizard displays an Export Fields window. A Select Fields list presents a list of fields that the user can select to be included in the exported file. Alternatively, the user can click a Use Standard fields radio button with an adjacent field containing a drop down menu of available formats to choose the type from (e.g., Microsoft Outlook). By selecting a standard set of fields, external programs may easily recognize the format and fields that are output. When a user chooses a comma separated value, fewer column headings are selected, and may include headings that are unique to ProjectPoint™ (such as 'Remember this Password' and 'Notify by Email', etc.). Once the fields have been selected, a Next button may be selected by the user.

In response, a Select Members window appears. A Select Members list on the Select Members window allows the user to select the member names to include in the exported information file. To add ALL members to the Select Members list (even if some are not selected), the user can click Select All. To remove all the members from the Select Members list, the user can click Clear All. Once members have been selected, the user can click finish to complete the export process and store the exported information file in the specified file location.

Member List

A member list may be displayed in a window of ProjectPoint™. A member list displays all of the members associated with the currently selected file, project, or site. To use the member list, the user first selects the project (or site) desired. Thereafter, the user can select the member list icon 214 from any area. To see the member list that includes all the members on the site, the user must choose the site name. From the member list window, the user can select a recipient(s), and elect to send email, update/refresh the member list, or update the personal information for the selected recipient.

To create and send an email message to the recipient(s), the user can click a Send email icon. Individuals, groups, and individuals within groups can be included in the email recipient list.

To update, refresh the member list, the user can click a Refresh hierarchy icon. As Site or Project Administrators add new members, the information in the Member List is updated to reflect the latest additions or changes. If a user has been working in ProjectPoint™ for an extended period of time, the refresh action will allow the user to see the most current member list data.

To view the selected member's personal contact information, the user can click a Personal Information icon.

External References

Support for external references (XREFS) may also be provided. An XREF is a method used to link drawing files together. For example, an existing spreadsheet may be inserted into a word processing document or drawing. Thus, the word processing document has a spreadsheet as an external reference. XREFS are convenient to use because once all drawing files are linked, all updates to the XREF files are automatically reflected in the original drawing file. When a XREF icon or button is selected, a list of all XREFS associated with the selected drawing appears.

What's New Area

Embodiments of the invention track all files, comments, and notes that are added to the project, and displays them in a What's New List. The list contains files that have been added or changed in the project since the last time the user reviewed them. Once a user have viewed the contents of a file, it is automatically marked as read and is no longer listed in What's New. A user may also manually mark a file as read.

If a user clicks What's New in the ProjectPoint™ Bar 204 and nothing is displayed, then the user is current with the project, or, the only unread project files are items the user created or edited. If there are files shown, the user can view or edit them, or, mark them as read.

To see what's new, the desired project is selected in field 202 and the What's New icon is selected from the ProjectPoint™ Bar 204. All unread files are shown in the Tree View 206. A Read column indicates the following:

V=unread item is a version

D=unread item is a discussion thread.

When the file is selected in the Tree view 206, the contents of the file are displayed in the Details view window 208 (in the View tab if it's a file, or in the Discussions tab if it's a comment). To mark an item as read the user right-clicks the item, and selects "Mark as Read" from the menu. Additionally, a user can clear all the files in the What's New list without reading them by positioning the cursor in a white space area (not on a file name), right-clicking, and selecting "Mark All as Read".

ALTERNATIVE EMBODIMENTS

Other configurations and/or user interfaces are possible without departing from the scope of the present invention. For example, any type of computer, such as a mainframe, minicomputer, workstation or personal computer, could be used with the present invention. In addition, any software program, application or operating system having a user interface could benefit from the present invention.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description.

We claim:

1. A computer-implemented apparatus comprising:
   a computer server;
   an interactive web site hosted on the computer server, wherein the interactive web site is configured to provide access to architectural project information, wherein one or more areas of the interactive web site provide for:
   modification and organization of:
      a display of the interactive web site;
      site members of the interactive web site;
      one or more projects including storing, organizing, and displaying a listing of drawings and text files in project folders and standard folders, and displaying drawings and text files, wherein project related administration tasks are available if a user is working with the project folders and such project related administration tasks are not available when working with the standard folders; and
   project members of the one or more projects including defining access permissions for project members to access the project folders, the standard folders, the drawings, and the text files.

2. The apparatus of claim 1 wherein access permissions can be defined for site members of the interactive web site.

3. The apparatus of claim 1 wherein a tree hierarchical view of the interactive web site displays the listing of the drawings and text files and the project folders and standard folders.

4. The apparatus of claim 1 wherein the interactive web site is further configured to allow the user to markup the drawing.

5. The apparatus of claim 1 wherein aspects of the interactive web site are installed and executed on a client computer.

6. The apparatus of claim 1 further comprising updating project information stored on the server by transferring information from a local computer to the server.

7. The apparatus of claim 1 wherein a feature of the interactive web site provides for emailing a site member upon a change in access permissions of the site member.

8. The apparatus of claim 1 wherein the area for the modification and organization of the display of the interactive web site comprises an area to specify the location of information to be displayed on the interactive web site.

9. The apparatus of claim 1 wherein the interactive web site further comprises an activity log that captures activities of site members on the interactive web site.

10. The apparatus of claim 9 wherein information in the activity log can be filtered based on one or more specified properties.

11. The apparatus of claim 1 wherein the site members of the interactive web site may be organized in a group and wherein the interactive web site provides the ability to define access permissions for the group.

12. The apparatus of claim 1 wherein the interactive web site further comprises an area for discussing aspects of a project.

13. The apparatus of claim 1 wherein the interactive website further comprises the ability to import and export information.

14. The apparatus of claim 1 wherein the interactive web site is created by a user without action or interaction with a site administrator.

15. The apparatus of claim 1 wherein the user can designate and change a uniform resource locator (URL) for a location of project information when the user is working with the project folders and not when working with standard folders.

16. A method for providing access to architectural project information comprising:
  accessing architectural project information using an interactive web site hosted on a server, wherein one or more areas of the interactive web site provide an ability to modify and organize:
    a display of the interactive web site;
    site members of the interactive web site;
    one or more projects including storing, organizing, and displaying a listing of drawings and text files in project folders and standard folders, and displaying drawings and text files, wherein project related administration tasks are available if a user is working with the project folders and such project related administration tasks are not available when working with the standard folders; and
  project members of the one or more projects including defining access permissions for project members to access the project folders, the standard folders, the drawings, and the text files.

17. The method of claim 16 further comprising the interactive web site providing the ability to define access permissions for site members of the interactive web site.

18. The method of claim 16 further comprising displaying a tree hierarchical view of the listing of the drawings and text files and the project folders and standard folders.

19. The method of claim 16 further comprising the interactive web site allowing the user to markup the drawing.

20. The method of claim 16 further comprising installing and executing aspects of the interactive web site on a client computer.

21. The method of claim 16 further comprising updating project information stored on the server by transferring information from a local computer to the server.

22. The method of claim 16 further comprising emailing a site member upon a change in access permissions of the site member.

23. The method of claim 16 further comprising the interactive web site providing an area to specify the location of information to be displayed on the interactive web site.

24. The method of claim 16 further comprising capturing the activities of site members in an activity log.

25. The method of claim 24 further comprising filtering information in the activity log based on one or more specified properties.

26. The method of claim 16 further comprising:
  organizing the site members in a group; and
  the interactive web site providing the ability to define access permissions for the group.

27. The method of claim 16 further comprising the interactive web site providing an area for discussing aspects of a project.

28. The method of claim 16 further comprising importing information.

29. The method of claim 16 further comprising exporting information.

30. The method of claim 16 further comprising creating the computer implemented interactive web site without action or interaction with a site administrator.

31. The method of claim 16 further comprising designating and changing a uniform resource locator (URL) for a location of project information, wherein such designating and changing is available when the user is working with the project folders and is not available when working with standard folders.

32. An article of manufacture for accessing architectural project information comprising:
  a program storage device, readable by a computer server, tangibly embodying at least one program of instructions executable by the computer server to perform method steps for hosting an interactive web site on the computer server wherein the interactive web site comprises:
    means for modifying and organizing:
      a display of the interactive web site;
      site members of the interactive web site;
      one or more projects including means for storing, means for organizing, and means for displaying a listing of drawings and text files in project folders and standard folders, and displaying drawings and text files, wherein project related administration tasks are available if a user is working with the project folders and such project related administration tasks are not available when working with the standard folders; and
    project members of the one or more projects including means for defining access permissions for project members to access the project folders, the standard folders, the drawings, and the text files.

33. The article of manufacture of claim 32 further comprising means for defining access permissions for site members of the interactive web site.

34. The article of manufacture of claim 32 further comprising means for displaying a tree hierarchical view with the listing of the drawings and text files and the project folders and the standard folders.

35. The article of manufacture of claim 32 further comprising means for allowing the user to markup the drawing.

36. The article of manufacture of claim 32 further comprising means for installing and executing the interactive web site on a client computer.

37. The article of manufacture of claim 32 further comprising means for updating project information stored on the server by transferring information from a local computer to the server.

38. The article of manufacture of claim 32 further comprising means for emailing a site member upon a change in access permissions of the site member.

39. The article of manufacture of claim 32 further comprising means for specifying the location of information to be displayed on the interactive web site.

40. The article of manufacture of claim 32 further comprising means for capturing activities of site members in an activity log.

41. The article of manufacture of claim 40 further comprising means for filtering information in the activity log based on one or more specified properties.

42. The article of manufacture of claim 32 further comprising:

means for organizing site members in a group; and means for defining access permissions for the group.

43. The article of manufacture of claim 32 further comprising means for discussing aspects of a project on the interactive web site.

44. The article of manufacture of claim 32 further comprising importing information.

45. The article of manufacture of claim 32 further comprising exporting information.

46. The article of manufacture of claim 32 wherein the interactive web site was created without action or interaction with a site administrator.

47. The article of manufacture of claim 32 wherein the user can designate and change a uniform resource locator (URL) for a location of project information when the user is working with the project folders and not when working with standard folders.

* * * * *